(12) United States Patent
Harrill et al.

(10) Patent No.: US 7,877,884 B2
(45) Date of Patent: Feb. 1, 2011

(54) DYNAMIC AXLE ALIGNMENT SYSTEM ONBOARD A VEHICLE

(76) Inventors: Mitchell C. Harrill, 140 Jenkins Rd., Rossville, GA (US) 30741; Elena Harrill, 140 Jenkins Rd., Rossville, GA (US) 30741

( * ) Notice: Subject to any disclaimer, the term of this patent is extended or adjusted under 35 U.S.C. 154(b) by 141 days.

(21) Appl. No.: 12/317,316

(22) Filed: Dec. 22, 2008

(65) Prior Publication Data

US 2009/0106990 A1 Apr. 30, 2009

Related U.S. Application Data

(63) Continuation-in-part of application No. 11/809,529, filed on Jun. 2, 2007, now Pat. No. 7,467,473, application No. 12/317,316, and a continuation-in-part of application No. 11/280,794, filed on Nov. 16, 2005, now Pat. No. 7,415,771.

(60) Provisional application No. 60/811,631, filed on Jun. 7, 2006, provisional application No. 60/630,149, filed on Nov. 20, 2004.

(51) Int. Cl.
*G01B 7/31* (2006.01)
(52) U.S. Cl. ..................... 33/264; 33/203.18
(58) Field of Classification Search .................. 33/203, 33/203.18, 203.19, 203.2, 264, 288, 600, 33/613, 645; 208/86.75
See application file for complete search history.

(56) References Cited

U.S. PATENT DOCUMENTS

| | | | | |
|---|---|---|---|---|
| 3,162,950 A * | 12/1964 | Hykes | .......................... | 33/228 |
| 3,691,642 A * | 9/1972 | Nolte et al. | .................... | 33/193 |
| 4,347,668 A * | 9/1982 | Johnston | ....................... | 33/193 |
| 5,433,296 A * | 7/1995 | Webberley | .............. | 188/1.11 L |
| 5,948,024 A * | 9/1999 | O'Mahony et al. | ............ | 701/29 |
| 6,397,448 B1 * | 6/2002 | Cobb | ....................... | 29/407.05 |
| 6,405,109 B1 * | 6/2002 | Kyrtsos et al. | ................. | 701/29 |
| 6,886,266 B2 * | 5/2005 | Kidd et al. | ..................... | 33/608 |
| 7,382,913 B2 * | 6/2008 | Dorranc et al. | .............. | 382/151 |
| 7,415,771 B2 * | 8/2008 | Harrill | ......................... | 33/264 |
| 7,467,473 B2 * | 12/2008 | Harrill et al. | ................... | 33/264 |
| 2007/0094882 A1 * | 5/2007 | Khan | .......................... | 33/645 |

* cited by examiner

*Primary Examiner*—G. Bradley Bennett

(57) ABSTRACT

The present invention relates to an apparatus onboard a vehicle for determining an actual alignment condition of the vehicle's axle during either dynamic or static conditions. Proper axle alignment depends on a perpendicular relationship between the axle and a centerline reference of the vehicle, which positions the wheels and tires parallel to the centerline. The invention, being installed onboard a vehicle with axle (58) properly aligned, in one embodiment, readily determines the perpendicular relationship between axle (58) and vehicle centerline (70) by measuring a spatial relationship between at least two control points or benchmarks established on the vehicle. These points may include point (58*a*) located at axle (58) and point (38) located on the vehicle's body or frame (62). Any change in the spatial relationship between the points is utilized as representation of a change in the perpendicular relationship between axle (58) and vehicle centerline (70).

20 Claims, 22 Drawing Sheets

Fig. 1a
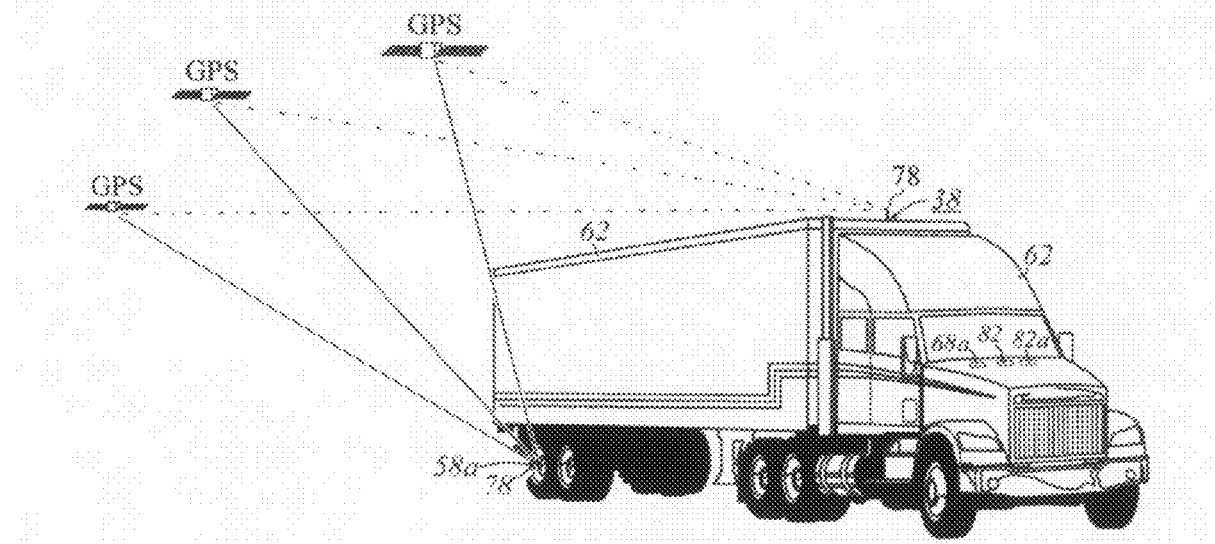
Fig. 1b Signals received from apparatus of Fig. 1a
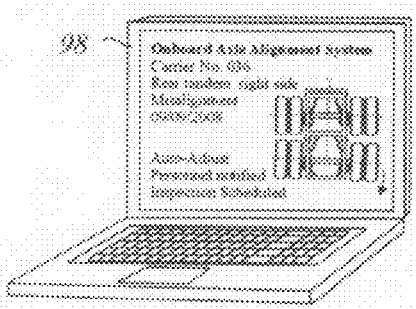
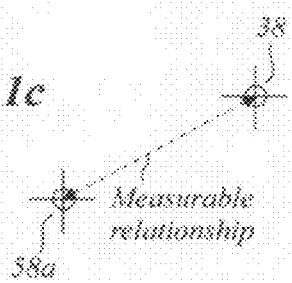
Fig. 1c Plan view Plan view Tractor vehicle →

Trailer vehicle →

Measurable relationship

Signals received from apparatus of Fig.5a

Plan view

*Plan view*

Plan view

Plan view

DYNAMIC AXLE ALIGNMENT SYSTEM ONBOARD A VEHICLE

CROSS-REFERENCE TO RELATED APPLICATION

This current non-provisional patent application is a continuation in part (CIP) of U.S. patent application Ser. No. 11/809,529 filed Jun. 2, 2007, now U.S. Pat. No. 7,467,473 which claims the benefits of U.S. provisional patent application Ser. No. 60/811,631 filed Jun. 7, 2006; and a CIP of patent application Ser. No. 11/280,794 filed Nov. 16, 2005, now U.S. Pat. No. 7,415,771, which claims the benefits of U.S. provisional patent application Ser. No. 60/630,149 filed Nov. 20, 2004, all of which the entire content is hereby incorporated by reference.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to vehicle axle alignment and, more particularly, to a dynamic axle alignment system onboard a vehicle for determining one or more axle alignment conditions, determining one or more axle alignment instructions, and/or controlling one or more axle alignment actuator devices, while the vehicle is either stationary or in motion. Proper axle alignment depends on the axle being perpendicular to a vehicle's centerline. The relationship between the axle and the vehicle's centerline is extremely critical for reducing driver fatigue, tire wear, tire temperature, tire failure, rolling resistance, component vibration and wear, operating cost, and for improving highway safety, fuel economy, and related vehicle efficiency and performance.

2. Description of Prior Art

Currently, the only provisions disclosed in prior art for onboard monitoring of a vehicle's axle alignment with respect to a vehicle's centerline is described in my U.S. Pat. No. 7,415,771, filed Nov. 16, 2005, entitled Apparatus Onboard a Vehicle for Instructing Axle Alignment. Currently, the only provisions disclosed in prior art for onboard monitoring and adjusting of an axle's alignment with respect to a geometric centerline is described in my U.S. patent application Ser. No. 11/809,529, filed Jun. 2, 2007, entitled Apparatus for Tractor Trailer Onboard Dynamic Alignment, which is now approved.

In reference to my previous patents, improvements to onboard monitoring of a vehicle's axle alignment have been made. These improvements include, but not limited to, using various sensors onboard the vehicle related to electromagnetic emitters or receivers, potentiometers, encoders, or ultrasonic devices for monitoring of the axle's position, and using the monitored position in determining an alignment condition of the axle. In addition, one embodiment includes determining the position of the axle using GPS for monitoring a relative position between the axle and a point located on the vehicle. Further improvements will become apparent throughout the present specification.

OBJECTIVES OF THE INVENTION

A primary objective of the present invention is to provide an apparatus onboard a vehicle for determining an alignment condition of the vehicle's axle, while the vehicle is either stationary or in motion. The primary objective also includes a method implemented by the apparatus for determining the axle's alignment condition. Another objective includes providing means and a method for documenting data relative to the axle's alignment condition. Additional functions of the present invention may include instructing axle alignment or realignment, controlling a level condition of the vehicle when the level condition effects the axle's alignment, and/or controlling one or more axle alignment actuator devices mounted on or in proximity to one or more of the vehicle's axles. The term "onboard the vehicle" is defined as being on or in proximity to a vehicle's upper body, under body, outer body, inner body, frame, frame member, suspension member, or axle.

Another objective of the present invention includes establishing a first control point on or in proximity to a vehicle's suspended member such as the vehicle's body or frame and establishing a second control point on or in proximity to the vehicle's non-suspended member such as an axle.

Another objective of the present invention includes establishing a first control point on a vehicle's non-suspended member such as the vehicle's axle and establishing a second control point on a second non-suspended member such as a second axle.

Another objective of the present invention includes providing means and a method for quantitatively or qualitatively measuring a relationship between a first control point located on or in proximity to an axle and at least one other control point located onboard the vehicle, and to use the measurement in determining the vehicle's axle alignment condition.

Another objective of the present invention includes providing means and a method for determining a distance between a first control point and a second control point located onboard a vehicle and to use the distance in determining the vehicle's axle alignment condition.

Another objective of the present invention includes providing means and a method for determining an angle relative to a vector between an axle and a reference point located onboard a vehicle.

Yet another objective of the present invention is to provide means and a method for measuring a relative position between two or more control points located onboard a vehicle and to use the measurement in determining at least one axle alignment condition of the vehicle.

Yet another objective of the present invention is to provide means and a method for either quantitatively or qualitatively comparing a relationship between two control points as to an axle being perpendicular to a vehicle's body or frame centerline, vehicle's geometric centerline, or a vehicle's direction of travel.

Yet another objective of the present invention is to provide means and a method for collecting, storing, printing, displaying, comparing, or transmitting axle alignment data that relates to a measurable relationship between two or more control points located onboard a vehicle.

Yet another objective of the present invention is to provide means and a method for collecting, storing, printing, displaying, comparing, or transmitting data that relates to a perpendicular position between an axle and a vehicle's body or frame centerline, vehicle's geometric centerline, or vehicle's direction of travel.

Yet another objective of the present invention is to provide means and a method for providing documentation through collecting, storing, printing, displaying, comparing, or transmitting data that relates to an alignment or misalignment of an axle as compared to a vehicle's body or frame centerline, vehicle's geometric centerline, vehicle's direction of travel, or one or more reference points onboard the vehicle.

Yet another objective of the present invention is to include a computer and algorithm with the present invention for determining a vehicle's axle alignment condition, determining an instruction for axle alignment or realignment, or controlling one or more axle alignment actuators.

Yet another object of the present invention is to utilize an air supply unit onboard a vehicle for supplying air to one or more of the vehicle's suspension airbags or tires by using a computer and algorithm for controlling the air supply which inflates and/or deflates the airbags or tire with respect to an axle's alignment condition.

Yet another objective of the present invention is to provide means and a method for collecting, storing, printing, displaying, comparing, or transmitting processed data that relates to an alignment or misalignment of an axle as compared to a vehicle's body or frame centerline, vehicle's geometric centerline, vehicle's direction of travel, or one or more reference points onboard a vehicle, while the vehicle is either stationary or in motion.

Yet another objective of the present invention is to provide means and a method for identifying a misaligned axle.

Yet another objective of the present invention is to provide means and a method for identifying a misaligned axle and to provide means and a method for detecting the direction of misalignment.

Yet another objective of the present invention is to provide means and a method for identifying a misaligned axle and to provide means and a method for quantitatively measuring the misalignment.

Yet another objective of the present invention is to provide means and a method for instructing the alignment of an axle.

Yet another objective of the present invention is to provide means and a method for instructing the realignment of a misaligned axle.

Yet another objective of the present invention is to provide means and a method for identifying a particular vehicle, a particular axle, a particular side of the axle, a particular direction in which to align the axle, and for determining when the axle's alignment is correct.

Yet another objective of the present invention is to provide means and a method for determining a misalignment of an axle and to provide means and a method for repositioning the axle perpendicular to the vehicle's body or frame centerline, vehicle's geometric centerline, or vehicle's direction of travel, while the vehicle is stationary or in motion.

Yet another objective of the present invention is to provide means and a method for identifying an axle's path of motion, while the vehicle is being driven or in motion.

Yet another objective of the present invention is to provide means and a method for identifying an axle's path of motion, while the vehicle is being driven or in motion, and for collecting, storing, printing, displaying, comparing, or transmitting processed data that relates to the axle's path of motion.

Yet another objective of the present invention is to provide means and a method for identifying and/or determining a weight load of a vehicle.

Yet another objective of the present invention is to provide means and a method for sensing the vehicle's empty weight, distribution of loaded weight, load shift, and/or center of gravity (CG) with respect to an axle's alignment.

Yet another objective of the present invention is to provide a display for displaying load information to dock loaders and/or the vehicle driver.

BRIEF SUMMARY OF THE INVENTION

The present invention relates to a dynamic axle alignment system onboard a vehicle for monitoring and optionally adjusting an axle's alignment while the vehicle is either stationary or in motion. Every vehicle has two centerlines, either of which may be selected as a reference for axle alignment. The first centerline is a body centerline, defined as a longitudinal axis along the center plane of the vehicle's body or frame. The second centerline is a geometric centerline, defined as a longitudinal axis through the midpoint of the rear axle and intersecting the midpoint of the front axle. Ideally, both centerlines should coincide; however, one must be selected as a reference for axle alignment. The choice of centerline is determined when the axle is first properly aligned. Proper alignment of an axle exist when the axle is perpendicular to the reference centerline, wheels and tires are parallel to the centerline, and the axle's thrust or drag line vector coincides with the centerline. The present invention, being installed onboard the vehicle, will monitor the position of a selected axle with respect to the selected centerline reference by monitoring a relationship between two or more points onboard the vehicle and using the monitored relationship for determining the alignment condition of the axle.

The perpendicular position of the axle, as compared to the vehicle's centerline, may be measurably monitored by selectively establishing a first point located onboard the vehicle, which may be considered a fixed master control point, and selectively establishing a second point located on or in proximity to the vehicle's axle. These two points serve as control points or benchmarks. A quantitative measurable relationship exists between the control points which is comparative to the axle's alignment to the vehicle's centerline reference or the vehicle's direction of travel. In other words, the measurable relationship of the control points is quantitatively altered when the axle changes position as compared to the vehicle's centerline or direction of vehicle travel. Thus the present invention may be used for monitoring the alignment of an axle as compared to the vehicle's centerline or direction of travel by monitoring the measurable relationship of the two control points. The measurable relationship of the two control points may include additional points or lines which may help define the way the two control points interact with each other. A change in the measured relationship between the two control points may be translated into a meaningful, quantitative or qualitative determination for determining one or more axle alignment or misalignment conditions, one or more axle alignment or realignment instructions, data for controlling one or more axle alignment actuators, data for controlling an air supply to one or more of the vehicle's tires or suspension airbags with respect to axle misalignment caused by an unleveled vehicle.

Axle alignment conditions qualitatively determined by the present invention may include, but not limited to, proper axle alignment, axle misalignment, axle's drag angle, drag line vector, axle's thrust angle, thrust line vector, tandem scrub angle, axle motion, axle alignment with respect to spring wrap condition, axle alignment with respect to a weight load, axle alignment with respect to a leaning vehicle cause by an uneven weight load, axle alignment with respect to a leaning vehicle due to incorrect air pressure of an airbag suspension, axle alignment with respect to a leaning vehicle caused by incorrect tire pressure, or distinguishing between an axle alignment condition and a wheel alignment condition. Furthermore, quantitative digital values may be determined which represent dynamic or static axle conditions.

Axle alignment conditions which place the axle's thrust or drag angle to the left of the vehicle's centerline is referred to as negative conditions and to the right as positive conditions. These conditions define various relationships between the axle's alignment and the vehicle's centerline with respect to the vehicle's direction of travel.

Axle alignment instructions, notices, or alerts provided by the present invention may include, but not limited to, a particular vehicle, a particular axle to align, a particular side of the axle to align, a particular direction to align the axle, when to stop alignment of the axle, an indication that the axle is properly aligned, irregular axle motion, a particular side of an axle causing irregular axle motion, threshold value exceeded, axle misalignment, inspection due, low air pressure relative to a particular tire, low air pressure relative to a particular airbag suspension.

Axle alignment actuators, which may be controlled by the present invention, may include but not limited to rotary, linear, or oscillatory actuators such as hydraulic cylinders, pneumatic actuators, and electric motors. All of which may be mounted on or in proximity to the vehicle's frame, axle, or suspension member. In addition to the actuator, a safety means such as a lever, locking pin, gear, and/or sensors may be included for preventing unwanted movement of the actuator, axle, or suspension member. Furthermore, the axle alignment actuators may be mounted onboard the vehicle relative to at least one selected from the group of an axle, trailing arm, telescoping trailing arm, control arm, spring, frame or frame member, knuckle or spindle. In some applications actuators may possibly operate under continuous variable rates and require a cooling means such as air, liquid, or gases.

Axles which may be monitored and adjusted by the present invention may include, but not limited to, steerable and non-steerable axles such as live, straight, dead or lazy, lift, drag, tag, pusher, split, tandem, drive, trailer, or portal axles.

BRIEF DESCRIPTION OF DRAWINGS

FIG. 1a shows one example of the present invention in one embodiment having a GPS receiver and one or more GPS antennas mounted onboard the vehicle and in communication with a Global Positioning System (GPS) or satellite network for monitoring a vehicle's axle alignment.

FIG. 1b shows a computer receiving signals relative to axle alignment and related data sent from the present invention and illustrating related graphics.

FIG. 1c is an example of a measurable relationship between the two points seen in FIG. 1a.

FIG. 2b is an example of a measurable relationship between the two points seen in FIG. 2a.

FIG. 4a shows a plan view of various configurations for monitoring points using the present invention onboard a vehicle.

FIG. 4b is an example of a measurable relationship between two points selected from the configurations shown in FIG. 4a.

FIG. 5b shows a handheld receiver receiving wireless signals transmitted from the present invention shown in FIG. 5a.

DRAWING

Reference Numerals

Figure 2A:
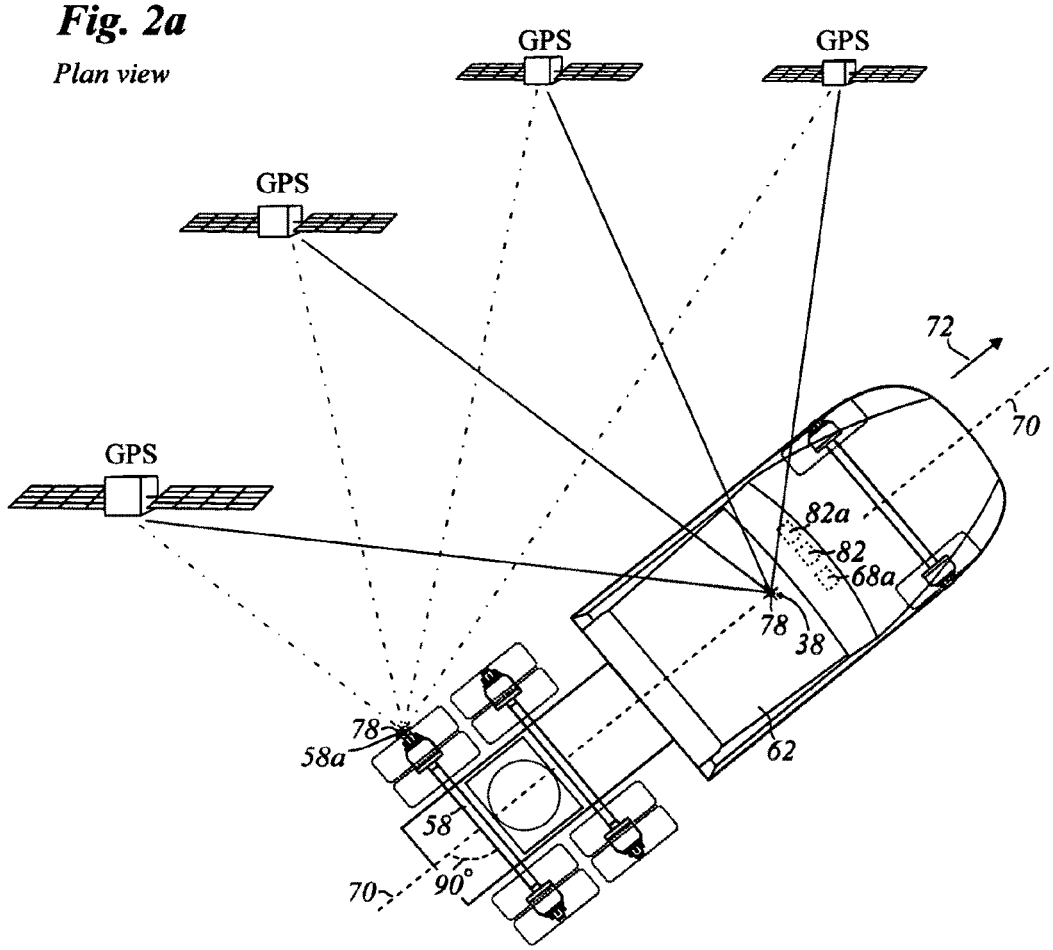
FIG. 2a shows a plan view of GPS satellites in communication with GPS antennas located at two points onboard the vehicle.

20—Mounting plate;
20a—Mounting base for a baseline establishing device such as a rod or mechanical linkage;
22—Plate cover;
24—Opening;
26—U type bolts;
28—Baseline: a line or line segment such as a measuring rod, a time of flight light wave from a camera or laser, ultrasonic wave, electromagnetic wave such as radio;
28a—Laser having measuring properties;
28b—Camera having measuring properties;
28c—Target or detector for a laser or camera;
28d—Wave emitting source such as a light wave, electromagnetic wave, or ultrasonic wave, etc, which may alternatively include a built-in detector;
30—Baseline producing device such as a time of flight sensor of a camera or laser, ultrasonic, radio, electromagnetic radiation emitter, or measuring rod;
30a—A mechanical arm, rod, or linkage;
32—Hinge;
34—Position sensor;
36—Sensor support bracket;
38—First control point or benchmark located onboard the vehicle or zero point;
40—Sensors, segmented sensing plane, or directional sensors;
40a—Electrical measuring device such as an encoder or potentiometer;
42—Wiring connection;
44—Reset switch;
46—Indicator guide;
48—Guide slot;
50—Longitudinal groove for mechanical link;
52—Sensor cover;
54—Flex boot;
56—Housing tube;
58—Axle;
58a—Control point or benchmark located on or in proximity to an axle or suspension member;
60—Axle deviation;
60a—Angle of deviation;
62—Frame rail;
64—Sensor central axis or centerline;
66—Electromagnetic wave emitter and antenna;
66a—Electromagnetic wave receiver and antenna;
68—Handheld receiver;
68a—GPS receiver onboard the vehicle;
70—Vehicle's centerline;
72—Direction of travel;
74—Alignment threshold;
76—Axle motion values;
78—GPS antenna;
80—Frame member or extension;
82—Computer or logic;
82a—Onboard display;
84—Actuator;
84a—Mounting bracket;
86—Bolt or other fastening means;
88—Rotary axle adjustment mechanism;
88a—Oscillatory or rocker arm axle adjustment mechanism;
88b—Manual axle adjustment mechanism;
90—Linear slotted hole;
92—Dowel pin, bolt, or other suitable securing means;
94—Trailing arm;
94a-Telescoping arm;
98—Remote computer;
140-148—Method steps for setup of the present invention;
160—Air supply unit placed onboard the vehicle;
162—Airbag suspension;
164—Level sensor;
166—tire;
CG—Center of gravity.

FLOWCHART

Reference Numerals

100—Start;
102—Read OP: Read Operations for front and rear axle position sensor's left and right sides;
104—Loop connector;
106—OP=0?: Are Operations equal to zero?;
108—Axle alignment correct;
108a—Axle misalignment;
110—Left side drive axle LSDA>0: position sensor 40 lower left quadrant is greater than zero;
110a—Alignment condition: negative thrust angle caused by the left side of rear drive axle being rearward;
112—Left side drive axle LSDA<0: position sensor 40 upper right quadrant is less than zero;
112a—Alignment condition: positive thrust angle caused by the left side of rear drive axle being forward;
114—Right side drive axle RSDA>0: position sensor 40 lower right quadrant is greater than zero;
114a—Alignment condition: positive thrust angle caused by the right side of rear drive axle being rearward;
116—Right side drive axle RSDA<0: position sensor 40 upper left quadrant is less than zero;
116a—Alignment condition: negative thrust angle caused by the right side of rear drive axle being forward;
118—Left side rear tandem LSRT>0: position sensor 40 lower left quadrant is greater than zero;

118a—Alignment instruction: adjust left side of the rear tandem axle forward;
120—Left side rear tandem LSRT<0: position sensor 40 upper right quadrant is less than zero;
120a—Alignment instruction: adjust left side of the rear tandem axle rearward;
122—Right side rear tandem RSRT>0: position sensor 40 lower right quadrant is greater than zero;
122a—Alignment instruction: adjust right side of the rear tandem axle forward;
124—Right side rear tandem RSRT<0: position sensor 40 upper left quadrant is less than zero;
124a—Alignment instruction: adjust right side of the rear tandem axle rearward;
126—Left side of rear tandem axle LSRT>0: position sensor 40 lower left quadrant is greater than zero;
126a—Airbag inflation instruction: supply air to the right side airbag suspension;
128—Left side of rear tandem axle LSRT<0: position sensor 40 upper right quadrant is less than zero;
128a—Airbag inflation instruction: supply air to the left side airbag suspension;
130—Right side of rear tandem axle RSRT>0: position sensor 40 lower right quadrant is greater than zero;
130a—Airbag inflation instruction: supply air to the left side airbag suspension;
132—Right side of rear tandem axle RSRT<0: position sensor 40 upper left quadrant is less than zero;
132a—Airbag inflation instruction: supply air to the right side airbag suspension;
134—Connector for results;
136—Receive results;
138—Stop.

DETAILED DESCRIPTION OF PREFERRED EMBODIMENTS

The present invention includes various configurations for mounting various devices for determining a measurable relationship relative to one or more reference points located onboard a vehicle. The spatial relationship or relative positioning of the reference points may be utilized as representation of a relationship between an axle and the vehicle's centerline. The measurable relationship may be translated into data for determining one or more axle alignment conditions, one or more axle alignment instructions, one or more instructions for controlling one or more axle alignment actuators, and/or instructions for controlling air supply to a tire or airbag of a vehicle's suspension.

FIGS. 1a, 1b, and 1c show an example of the present invention in one embodiment utilizing a satellite or Global Positioning System (GPS) for monitoring an axle's alignment of a coupled vehicle such as a tractor trailer. Determining the axle's alignment condition includes monitoring the axle's actual position relative to the axle's initial position through GPS electromagnetic sensors. This may be accomplished by mounting a first GPS satellite receiver's antenna 78 at a first fixed control point 38 selectively established onboard the vehicle such as the vehicle's roof (see FIG. 18 box 140); and mounting a second GPS satellite receiver's antenna 78 at a second fixed control point 58a established relative to the vehicle's axle at the outer hub or wheel cap (see FIG. 18 box 142). These two points serve as control points. Orbit position and other related data sent from the GPS satellites are received at each GPS antenna's electrical phase center, a point where the satellite signal is collected (not shown). Each GPS antenna 78 may be linked to a main GPS receiver 68a located onboard the vehicle, such as but not limited to the vehicle's interior compartment. Receiver 68a may be used for calculating a distance between the first GPS antenna's phase center and satellite, and the second GPS antenna's phase center and satellite. The receiver 68a or other suitable calculating means such as an onboard computer 82 may then combine these distances in a calculation for determining a measurable relationship (see FIG. 1c) between the first GPS antenna 78 at first point 38 and the second GPS antenna 78 at second point 58a (see FIG. 18 box 144). The measured relationship between the GPS antenna 78 at the first point 38 and the GPS antenna 78 at the second point 58a may be transmitted to a data processing means such as computer 82 for either quantitative or qualitative comparison of measured values to a predetermined reference frame or one or more predetermined values. This data may be used for gathering information relative to axle and suspension dynamics which may be beneficial to research and development of axle and suspension design. The predetermined values may further be used in determining one or more axle alignment conditions (see FIG. 7c and FIG. 18 box 146), one or more axle alignment instructions (see FIG. 8c and FIG. 18 box 148), and/or control the engagement and disengagement of one or more axle alignment actuators (see FIG. 8c and FIG. 18 box 148), which may be mounted relative to one or more of the vehicle's axles or suspension members. The alignment conditions and related data may be displayed in view of a driver by onboard display 82a or through wireless signals sent to a remote site or computer 98 (see FIG. 1b). In addition, the data obtained from the GPS axle monitoring system may further be used for controlling an air supply unit 160 (see FIG. 15), which may supply air to an airbag 162 of the vehicle's suspension (see FIG. 15) or to a tire (see FIG. 19), if the air pressure is determined to have an effect on the alignment of axle 58 through the leaning of the vehicle. Each GPS receiver antenna 78 must be utilized onboard the particular vehicle being monitored.

Figure 2B:
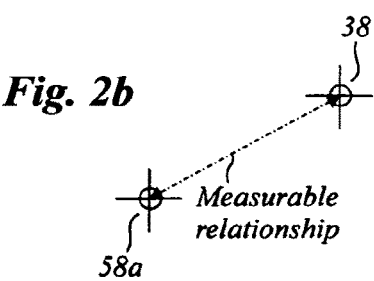

FIG. 2a shows a plan view of the GPS axle monitoring system of FIG. 1a used on a non-coupled vehicle. Axle 58 is shown perpendicular to the vehicle's centerline 70, and vehicle centerline 70 is relative to the vehicle's direction of travel 72. Any change in the spatial relationship or relative position of axle 58 and centerline 70 quantitatively alters the measurable relationship between the first GPS receiver's antenna 78 at first point 38 and the second GPS receiver's antenna 78 at second point 58a. FIG. 2b shows a measurable relationship between control point 38 and control point 58a seen in FIG. 2a.

Figure 3:
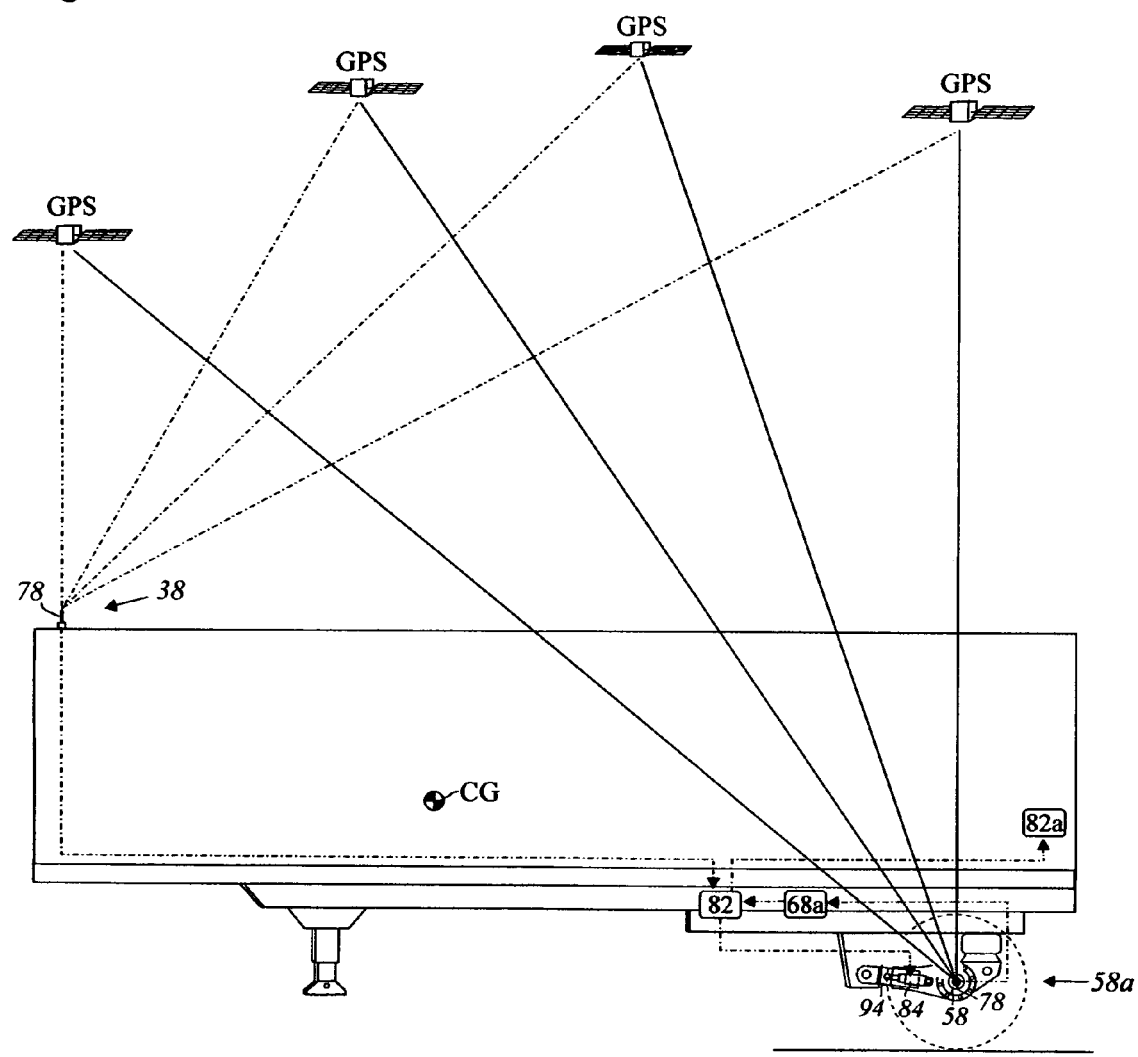
FIG. 3 shows using GPS for axle alignment monitoring and an axle alignment actuator attached to the vehicle's suspension member such as a trailing arm.
Figure 7B:
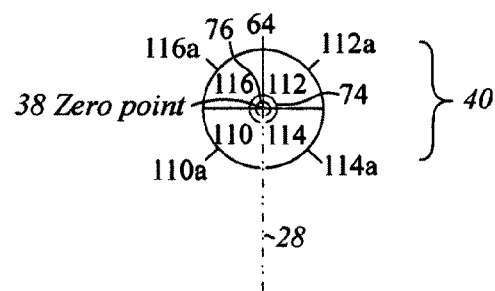
FIG. 7b shows a close up view of the sensor seen in FIG. 7a and the arrangement of the sensors for determining an axle's alignment condition.
Figure 7C:
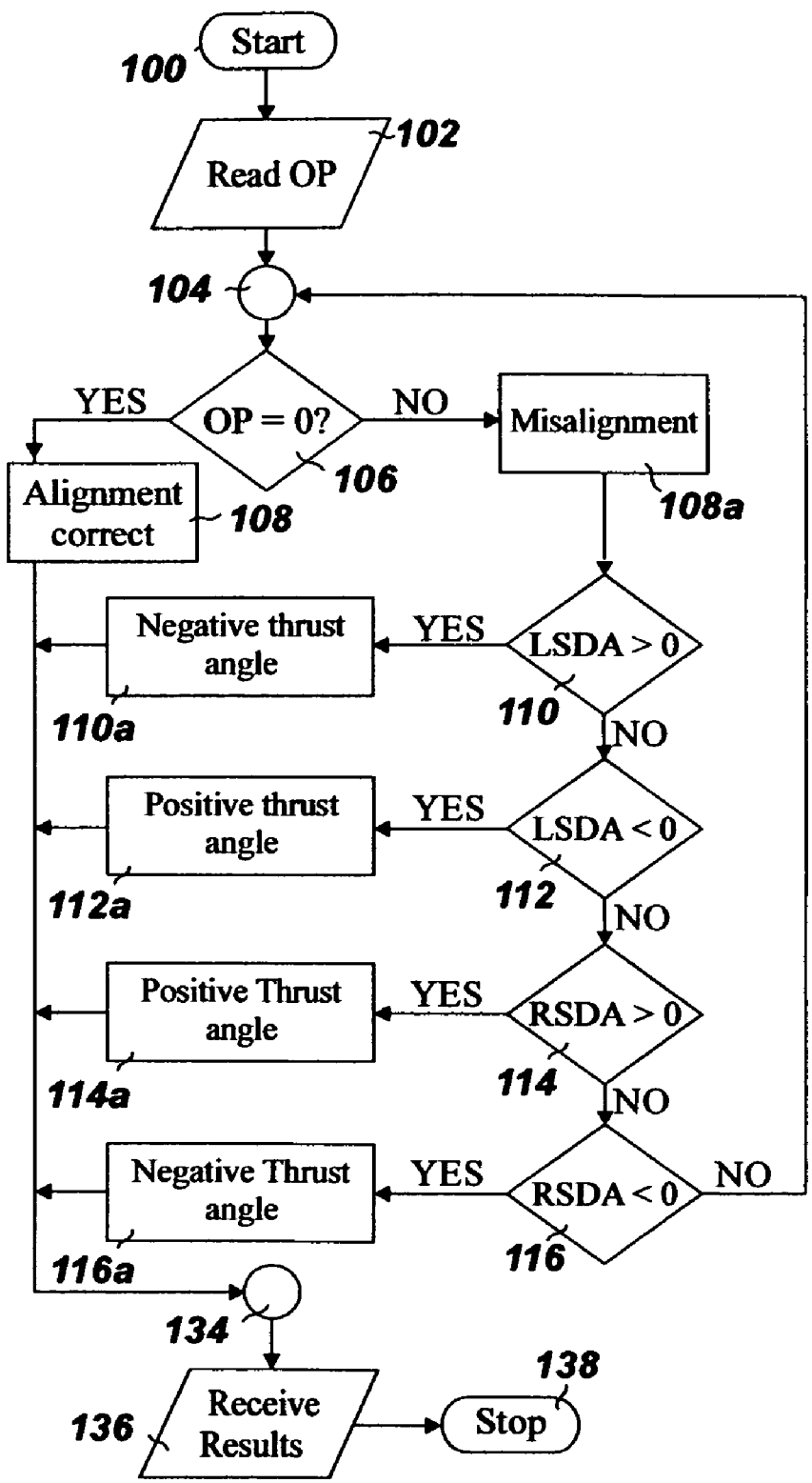
FIG. 7c shows an example of a flowchart representation of a solution algorithm using structured type programming for determining axle alignment conditions.
Figure 8C:
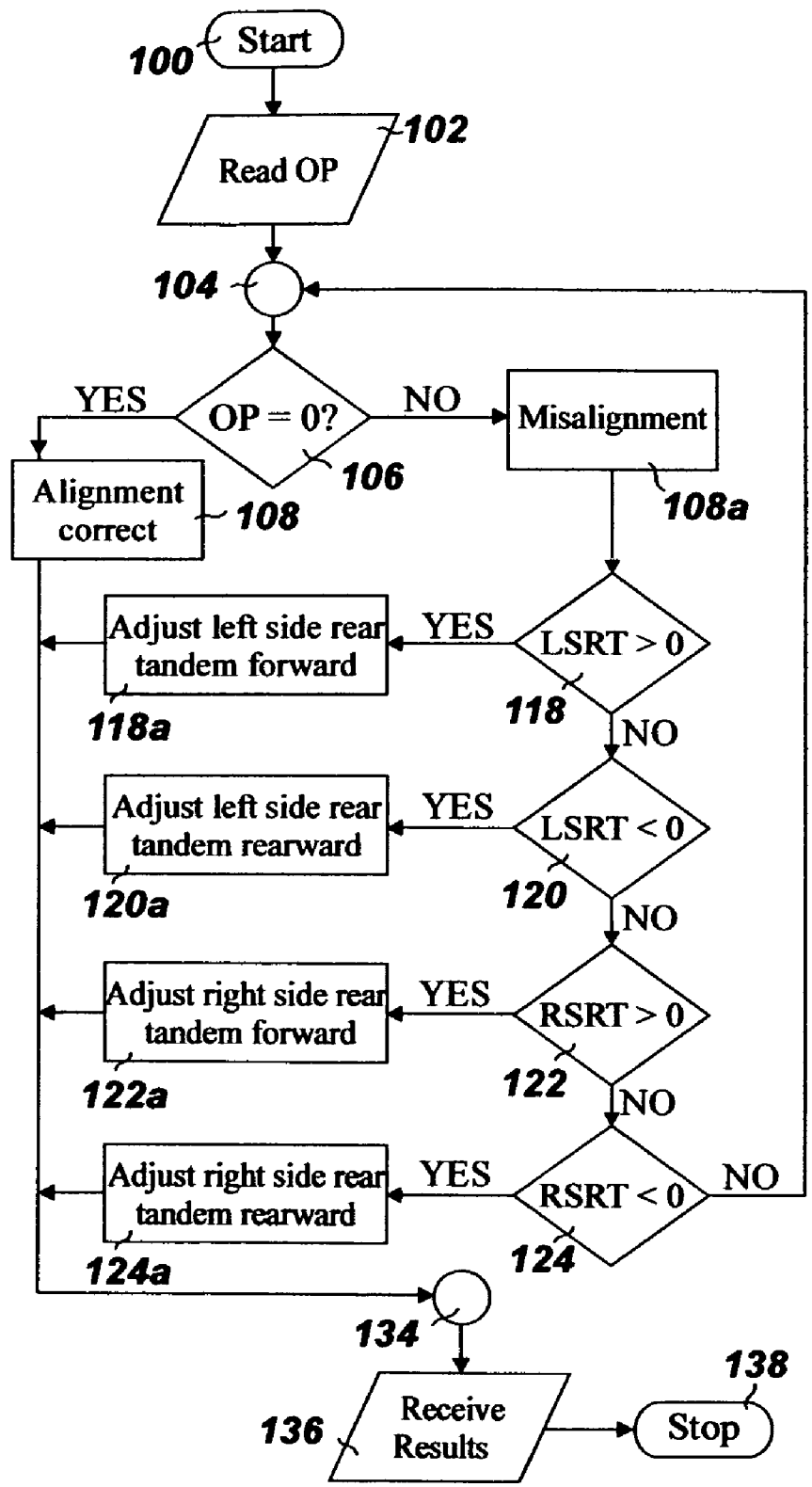
FIG. 8c shows an example of a flowchart representation of a solution algorithm using structured type programming for determining axle alignment instruction and for controlling an axle alignment actuator.
Figure 9B:
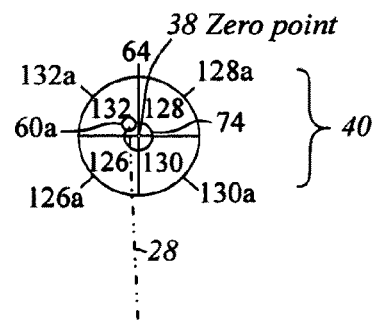
FIG. 9b shows a close up view of the sensor seen in FIG. 9a and the arrangement of the sensors for determining axle misalignment and controlling air supply to a vehicle's suspension airbag.

FIG. 3 shows a single semi trailer vehicle having a GPS receiver's antenna 78 mounted at a first fixed control point 38 located on the vehicle's roof. A second GPS receiver's antenna 78 mounted at a second fixed control point 58a located relative to the vehicle's axle 58. GPS satellites are shown in communication with each GPS antenna 78. GPS receiver 68a may be used for determining a distance measurement between satellites and each GPS receiver's antenna. The distance or measurement may be trigonometrically calculated for determining a distance between first point 38 and second point 58a. This data may be sent to computer 82 for processing and comparing the measurement to a predetermined reference frame or value such as seen in FIG. 7c, 8c, or 9c. The data may further be sent to an onboard display 82a. Display 82a may be located at the rear of the trailer in view of a person (dock loader) who loads the vehicle. Display 82a may further be used for displaying the weight of the load, distribution of the load, and/or center of gravity CG of the loaded trailer vehicle. The data may further be sent to an axle alignment actuator 84 mounted relative to trailing arm 94 for adjustment of axle 58, if axle 58 is determined to be misaligned according to the measurement between first point 38 and second point 58a. Alternatively, related data may be sent to a remote computer or receiver. The GPS axle monitoring system described in FIGS. 1a, 2a, and 3 may further be used as a means to achieve one or more of the objectives of the present invention listed herein.

Figures 4A, 4B:
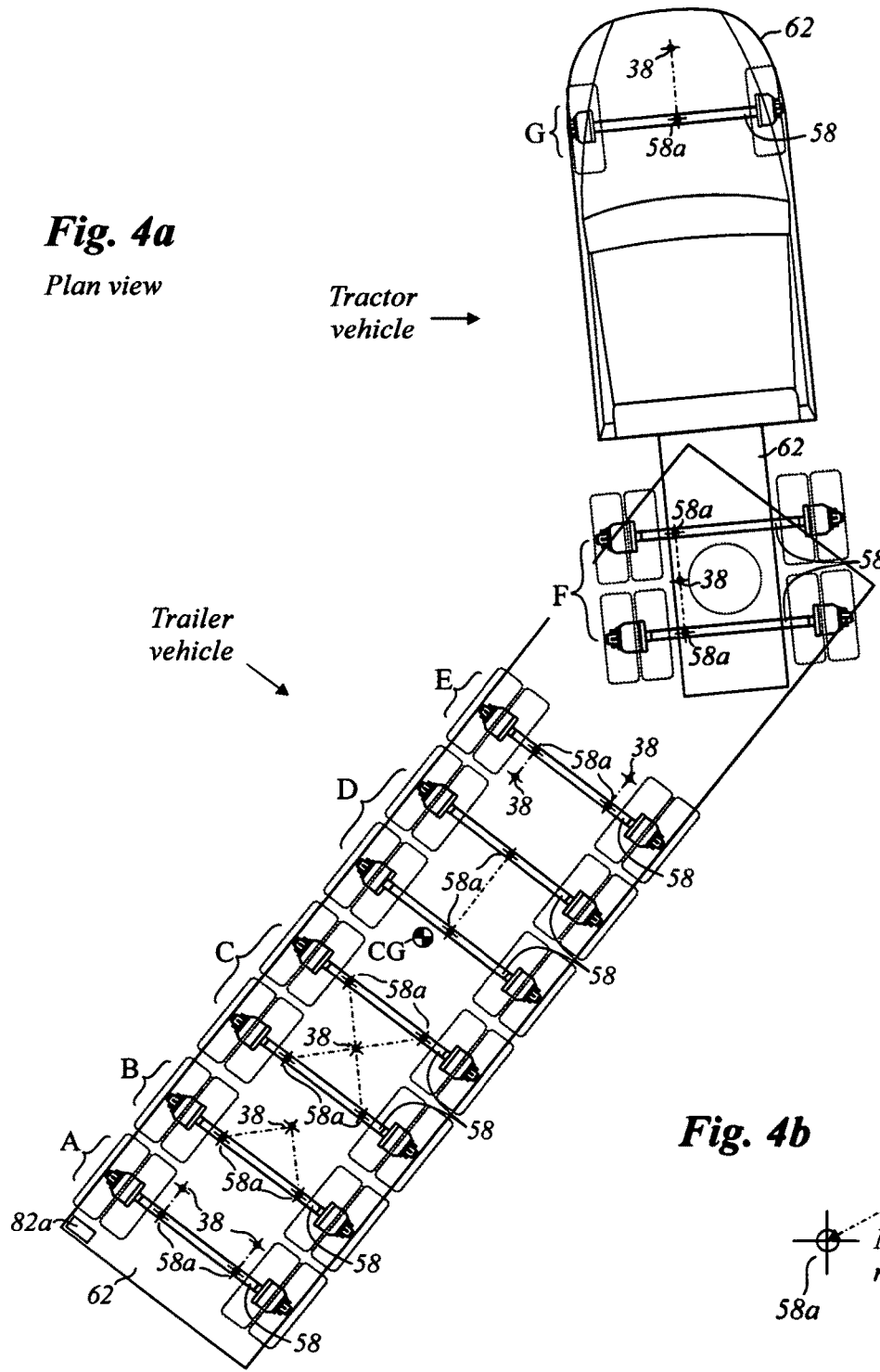

FIG. 4a shows a plan view of a tractor trailer vehicle with multiple axles and various configurations of location points used for establishing control points, which may be used for placing the present invention onboard the vehicle. The points shown may be used with non-GPS embodiments seen in FIGS. 5a, 7a, 10-15. The GPS embodiments, as previously described, and the non-GPS embodiments may both be used for determining a measurable relation between at least two control points located onboard the vehicle. The measurable relationship may then be used for determining a relative position between the axle's initial position and the axle's actual position, and further used in determining axle alignment conditions, procedures, and other related data based on the relative position.

Listed below are example configurations A-G as shown in FIG. 4a.

Example (A) is an arrangement of the invention consisting of a single axle 58 having two control points 58a located on axle 58. Control points 58a communicate with two control points 38 which are located on the trailer's frame or body 62.

Example (B) is an arrangement of the invention consisting of a single axle 58 having two control points 58a located on axle 58. Control points 58a communicate with a single control point 38 which is located on the trailer's frame or body 62.

Example (C) is an arrangement of the invention consisting of two axles 58 where each axle 58 has two control points 58a located on the axle. Control points 58a communicate with a single control point 38 which is located on the trailer's frame or body 62.

Example (D) is an arrangement of the invention consisting of two axles 58 where each axle 58 has a single control point 58a located on the axle. Control points 58a communicate with each other.

Example (E) is an arrangement of the invention consisting of a single axle 58 where axle 58 has two control points 58a located on axle 58. Control points 58a communicate with two control points 38, wherein the first control point 38 is located on the trailer's frame or body 62 aft of axle 58 and the second control point 38 is located on the trailer's frame or body 62 fore of axle 58.

Example (F) is an arrangement of the invention consisting of two axles 58 of a tractor vehicle where each axle 58 has a single control point 58a located on axle 58. Control points 58a communicate with a single control point 38 which is located between the axles on the tractor vehicle's frame or body 62.

Example (G) is an arrangement of the invention consisting of a single axle 58 having a single control point 58a located on axle 58. Control point 58a communicates with a single control point 38 which is located on the vehicle's frame or body 62.

Figure 18:
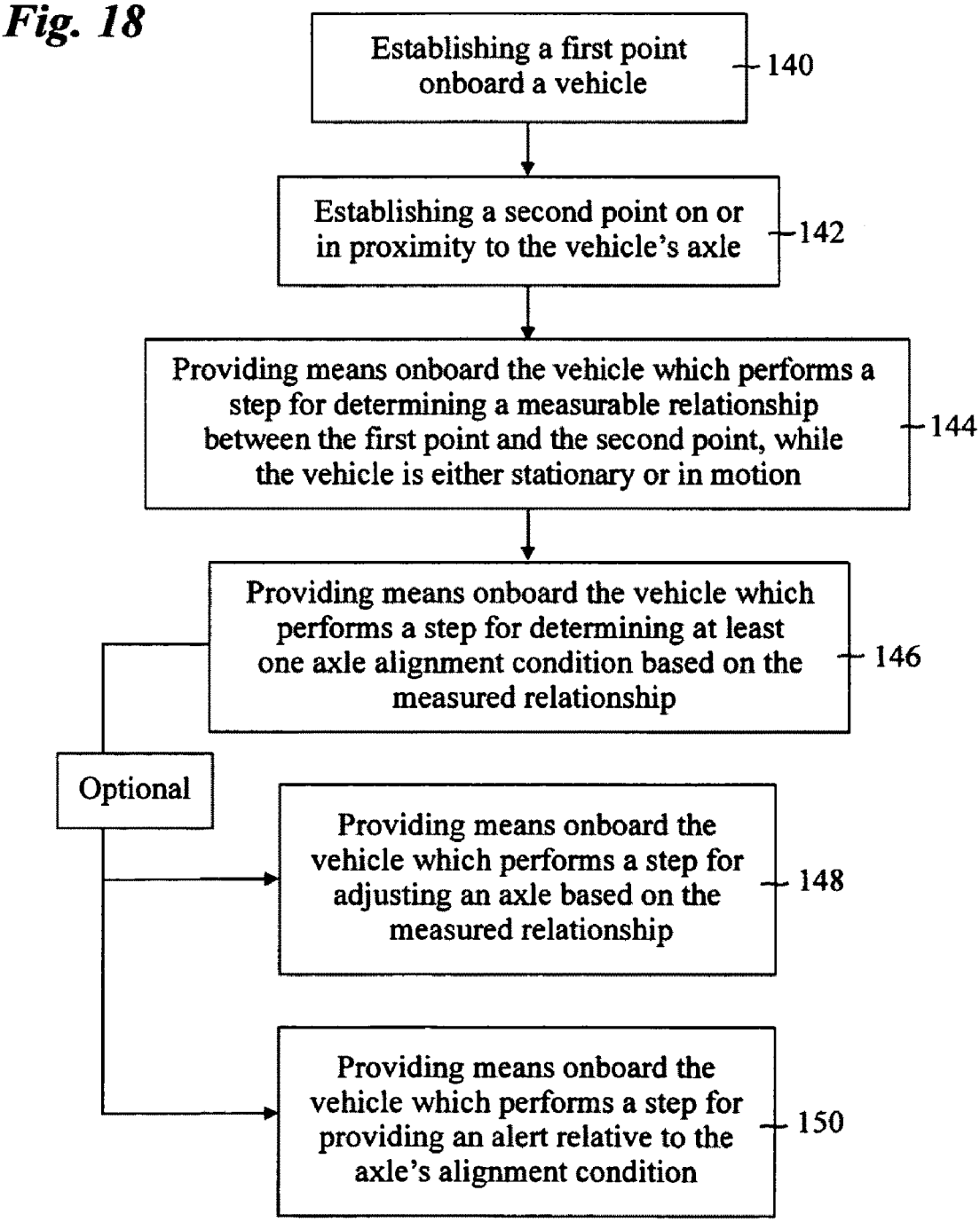
FIG. 18 is a flowchart that shows one example of method steps for setup and operation performed by the present invention.

In regards to the various arrangements, a measurement between control points located along the vehicle may be used for determining the vehicle's weight load and/or center of gravity CG. An example of center of gravity CG is shown in FIG. 4a located between examples (C) and (D). Furthermore, a method example is shown in FIG. 18 which may be applied for determining an axle's alignment condition using the previously described invention and configurations.

FIG. 4b is an example of a measurable relationship between two or more points selected from the configurations shown in FIG. 4a. The present invention, being placed relative to the described configurations may further be used in conjunction with any device described herein for achieving the objectives of the present invention.

Figure 5A:
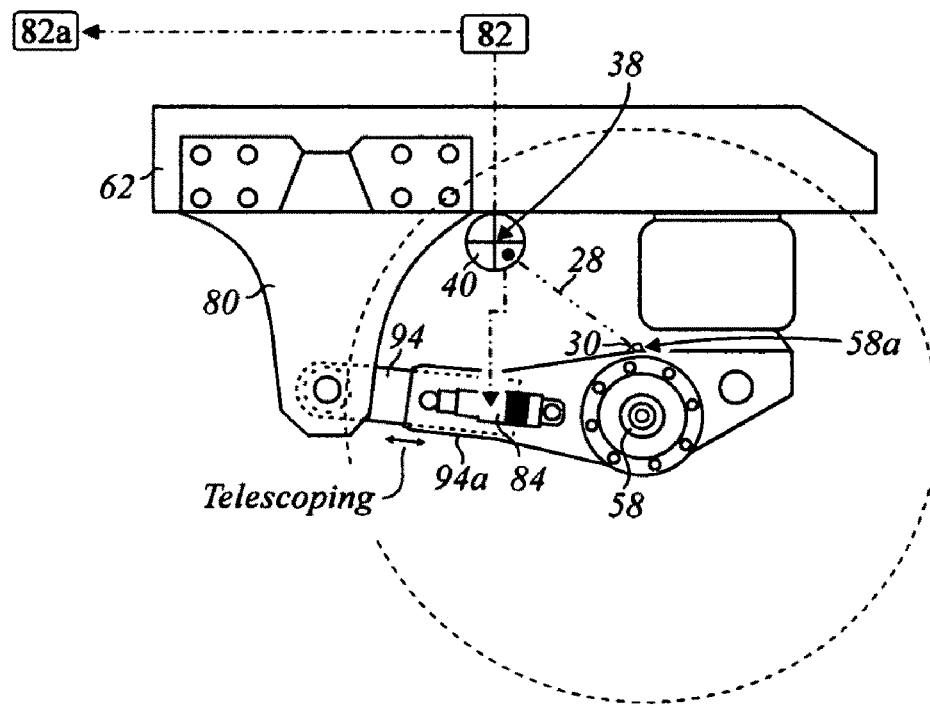
FIG. 5a shows an elevation view of a vehicle's suspension showing one embodiment of the present invention utilizing a baseline device in communication with sensors, an onboard computer, and an axle alignment actuator mounted inside a telescoping trailing arm.

FIG. 5a shows an example of one embodiment of the present invention mounted relative to a vehicle's body or frame 62, frame member 80, and axle 58. The embodiment utilizes a directional sensor 40 mounted at a first fixed control point 38 (see FIG. 18 box 140) on or in proximity to the vehicle's body or frame 62. A baseline device 30 is used for establishing baseline 28 that originates at a second fixed control point 58a (see FIG. 18 box 142) and ends on directional sensor 40. When the axle 58 dynamically moves relative to frame 62 axle alignment data is generated based on the relative position of baseline 28 and sensor 40. Axle alignment data may be sent to an onboard computer 82, onboard display 82a, remote computer 98 (seen in FIG. 1b) and/or to an axle alignment actuator 84. Computer 82 may store axle alignment data while the vehicle is in motion or stationary (see FIG. 18 box 144) and then use the data to determine one or more axle alignment conditions (see FIG. 7c and FIG. 18 box 146), one or more axle alignment instructions (see FIG. 8c), and/or instructions to control one or more axle alignment actuators 84 mounted relative to the vehicle's axle or suspension member, such as trailing arm 94 (see FIG. 8c and FIG. 18 box 148). Axle alignment actuator 84 is attached to arm 94 and telescoping arm 94a. The data generated in the process of comparison of a relative position of baseline 28 and sensor 40 may be utilized for controlling an engagement and disengagement of actuator 84 (see FIG. 8c). Actuator 84 alters the length of trailing arm 94 and slides member 94a to adjust a positioning of axle 58.

Alternatively, the data may be used for controlling an air supply unit 160 (see FIG. 15), which may supply air to a low airbag 15 (see FIG. 15) of the vehicle's suspension or a low tire (see FIG. 19), if the low air pressure is determined to have an effect on the alignment of axle 58. Furthermore, baseline device 30 and directional sensor 40 may be arranged in a vice versa manner, where baseline device 30 is mounted relative to the vehicle's body or frame 62 and directional sensor 40 is mounted relative to axle 58.

Figure 5B:
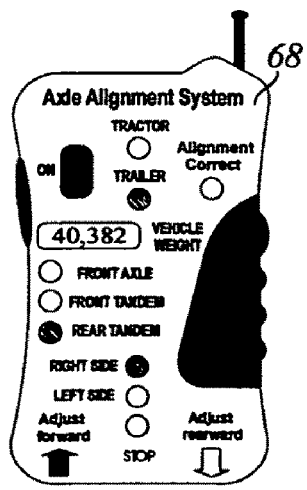

FIG. 5b shows one example of a wireless remote receiver 68 which may be used with the present invention. Receiver 68 may receive axle alignment data from computer 82 or sensor 40 located onboard the vehicle. Receiver 68 may display axle alignment data utilizing a LCD monitor or other suitable means such as lights or text shown on receiver 68.

Figure 6A:
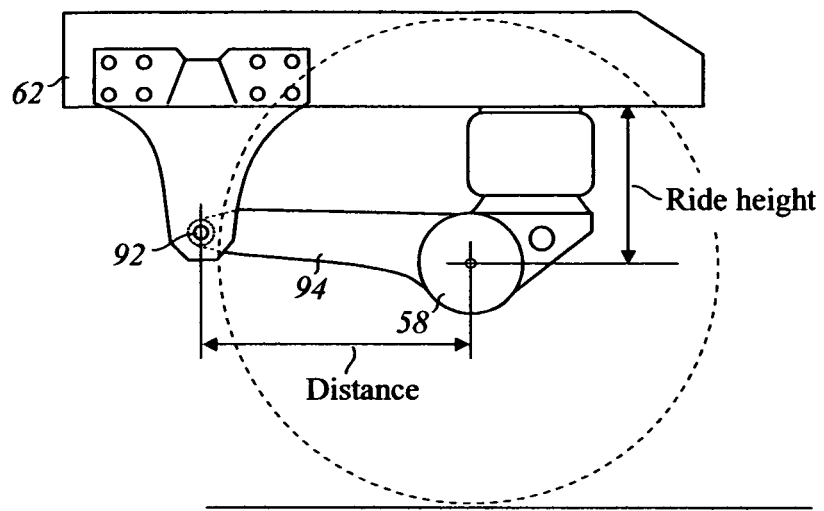
FIG. 6a shows an elevation view of a vehicle's suspension positioned at a normal ride height and a distance shown between the trailing arm pivot connection and the axle.

FIG. 6a shows an elevation view of a vehicle's suspension at a normal static ride height with a normal distance between a pivotal connection (or axis) at bolt 92 of trailing arm 94 and the center of axle 58. This distance may be determined along a horizontal datum plane.

Figure 6B:
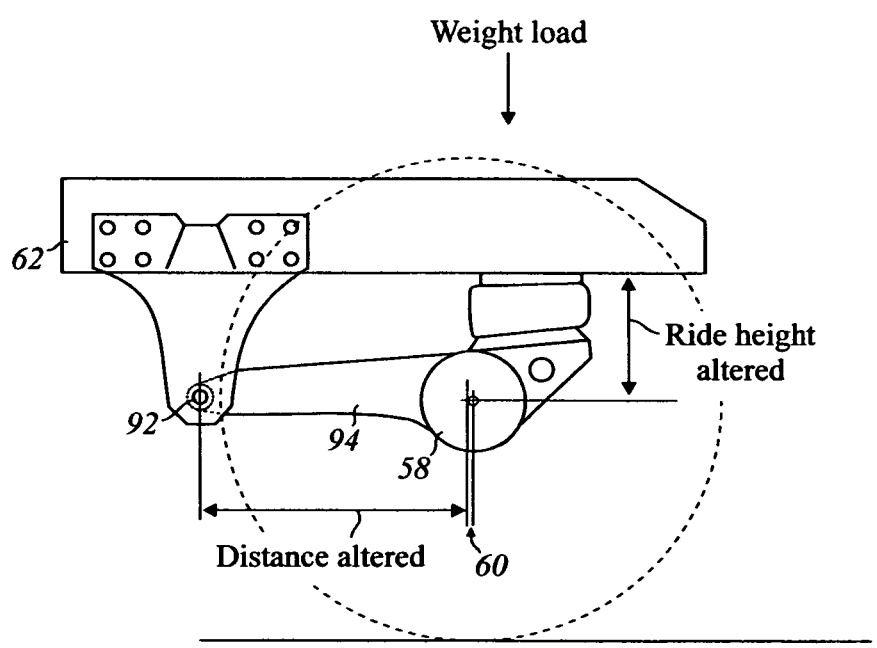
FIG. 6b shows an elevation view of a vehicle's suspension being compressed by a weight load which alters the distance between the trailing arm pivot connection and the axle.

FIG. 6b illustrates an example of a weight load on a vehicle which may alter the positioning of axle 58. For example, when the vehicle is loaded the vehicle's springs or airbags are compressed from the weight load and the ride height is altered. Trailing arm 94 will follow an arch of its axis located at bolt 92 and may alter the distance between bolt 92 and axle 58 (along the horizontal datum plane). If the weight is distributed evenly between the left side and the right side of the vehicle the distance between bolt 92 and axle 58 change at an equal rate on both sides of axle 58. This change, being equal doesn't affect the axle's alignment. However, it is possible for the distance between bolt 92 and axle 58 to become unequal from side to side (along the horizontal datum plane). This may be experienced when only one side of axle 58 is raised or lowered opposed to the other side. This would cause axle 58 to slightly deviate 60 momentarily from its original alignment relative to the opposing side. This momentary effect is not noticed by the driver; however, if a weight load on the vehicle is distributed unevenly, the vehicle may lean to one side. A leaning vehicle may have the same affect on the alignment of axle 58 as if only one side of the axle is raised, except the deviation will become constant until the load is redistributed or removed. Such misalignment may cause the vehicle to slightly skew from its normal direction of travel. The driver would then input a constant counter steer in order to keep the vehicle moving in a straight path.

Furthermore, a weight load may be determined using the present invention by measuring a substantially horizontal distance between first point 38 and second point 58a when the vehicle is empty and measuring the distance as weight is applied. By knowing the empty weight and distance between the control points it is possible to determine a vehicle's weight load as the distance changes with respect to the axle's position.

FIGS. 7a-9c shows examples of how the present invention may be used with a computer. In FIGS. 7c, 8c, and 9c show an example of flowcharts of solution algorithms for basic structured programming when using a computer with the present invention. The program may be used for determining an axle's alignment condition, instructing axle alignment or realignment procedure to a technician or machine, engaging or disengaging an actuator for aligning an axle, supplying air to a tire or airbag of the vehicle's suspension, or notifying or alerting an operator about axle alignment conditions through onboard or remote devices such as computer 82, computer 98, display 82a, or receiver 68.

The complexity of the program for axle alignment automation will depend on how many axle adjustments mechanisms are present on the vehicle. For example, the program will have fewer steps if the vehicle has only one axle adjustment mechanism on only one side of the axle and more steps if the vehicle has adjustment mechanism on both sides of the axle. The program will include even more steps if the vehicle has a third adjustment for adjusting the axle transversely as it will require steps for determining the transverse adjustment.

Figure 7A:
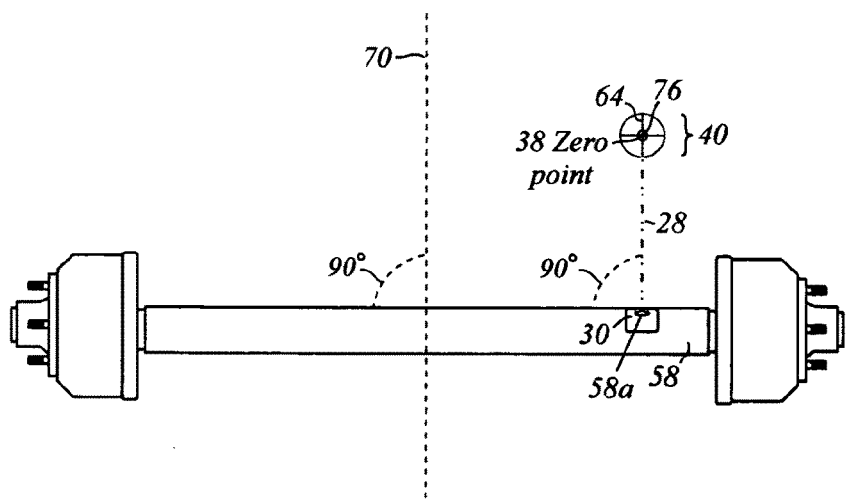
FIG. 7a shows how sensors may be arranged for determining a measurable relationship between a first point located onboard the vehicle and a second point located relative to the axle with respect to a properly aligned axle.

FIG. 7a shows one example of how the present invention may be arranged for determining a measurable relationship between a first fixed control point 38 at sensor 40 (see FIG. 18 box 140) and a second fixed control point 58a at baseline device 30 on axle 58 (see FIG. 18 box 142). Sensor 40 is shown located on or in proximity to the vehicle's body or frame 62 adjacent to axle 58. These two points are shown with respect to a properly aligned axle 58. In other words, axle 58 is shown in its initial position.

During setup of the present invention, baseline device 30 may be used for establishing a line perpendicular to axle 58 (illustrated through baseline 28) which may be aligned relative to a point along the central axis 64 of sensor 40. Baseline 28 has a first end starting at baseline device 30 and a second end ending at the sensor 40. Baseline 28 may be positioned parallel to the vehicle's centerline 70 as shown. When aligned, the second end of baseline 28 at the sensor 40 establishes a zero point 38 surrounded by a quadrant of sensors in order to either quantitatively or qualitatively measure the relationship between the first and the second control point (see FIG. 18 box 144). As weight is applied to the vehicle, baseline 28 will move horizontally fore or aft relative to central axis 64 at sensor 40, depending upon the weight of the load. At this point a new zero point 38 may be established. However, if the weight is distributed unevenly from side to side, baseline 28 will move away from its zero point 38 at central axis 64 of sensor 40 and indicate data that may be used to determine that the vehicle has an uneven weight load. Measuring may be performed while the vehicle is stationary or in motion. The relationship between the first and second point may include using sensor 40 and baseline 28 for measuring a longitudinal, lateral, or angular displacement between the first control point 38 and the second control point 58a. Any deviation about sensor 40 may be used for determining an actual position of axle 58 relative to its initial position, determining an alignment condition of axle 58 (see FIGS. 7c and 18 box 146), determining one or more alignment instructions relative to axle 58 (see FIG. 8c and FIG. 18 box 148) and/or producing signals for engaging and disengaging one or more axle alignment actuator devices which may align axle 58 (see FIG. 18 box 148).

The arrangement of devices seen in FIG. 7a may be positioned in a vice versa manner, where sensor 40 is mounted on the axle and baseline device 30 mounted adjacent to the axle. Alternatively, the baseline 28 is not required to be perpendicular to axle 58 as long as sensor 40 is arranged to recognize an angle of baseline 28.

Figure 8B:
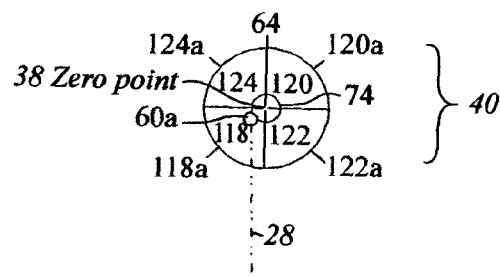
FIG. 8b shows a close up view of the sensor seen in FIG. 8a and the arrangement of the sensors for determining axle alignment instruction and controlling an axle alignment actuator.
Figure 8A:
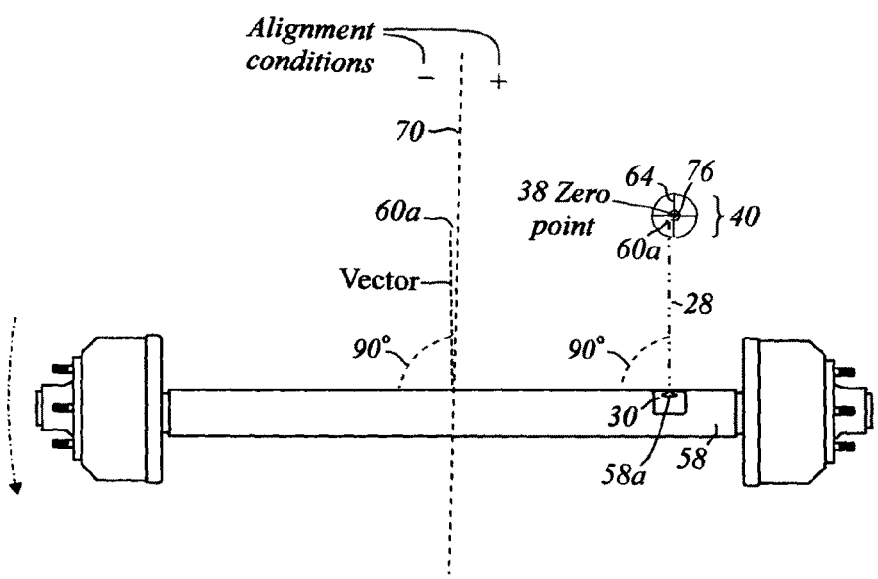
FIG. 8a shows how an arrangement of sensors may be utilized for determining a misaligned axle and how an axle alignment instruction may be generated.

In FIG. 7b, sensor 40 is shown divided into quadrants which are used for detecting and/or measuring an axle's vector or the angle of the vector by determining a relationship between baseline 28 and sensor 40 (shown in FIGS. 8a and 8b). Sensor 40 may include any number of sensors, segments, or pattern grids. Furthermore, predetermined specific coding may be used to generate specific alignment data relative to a distance between baseline device 30 and sensor 40 and/or angle between baseline 28 and sensor 40. This signal or code may directly communicate with a receiver for providing an axle's alignment condition, alignment instructions, (see FIG. 7c) axle motion values 76 (See FIGS. 7a and 7b) or other data relative to the axle's alignment.

As shown in FIG. 7a, baseline 28 intersects with a zero point 38 at central axis 64 of sensor 40 when the axle 58 is properly aligned. FIG. 7b shows specific coding arranged in quadrants surrounding zero point 38. As axle 58 moves under dynamic conditions (see FIG. 6b), baseline 28 simultaneously moves relative to sensor 40. When an axle misalignment conditions occur baseline 28 exceeds the predetermined threshold value 74. The quadrants of sensor 40 may be used for detecting and determining the misalignment condition of axle 58. The condition may further be identified as a condition associated with a particular position of the axle as compared to the vehicle's centerline, as known in the art and previously described herein. The quadrants may determine the condition when baseline 28 moves longitudinally and to the left or right of zero point 38 or a change in distance may determine the condition when using a wave source such as light, electromagnetic, or ultrasonic.

For clarity, see FIG. 7b simultaneously with FIG. 7c for comparison of the quadrants of sensor 40 to the algorithm seen in FIG. 7c.

For example, Start 100 begins the sequence of steps for determining an axle alignment condition of a rear drive axle. Read OP 102 reads the operations. Then tests if the operations equal zero (OP=0?) 106 and is executed if the condition is "YES" Alignment Correct 108 is indicated. The testing is exited at this time through Connector 134, Receive Results 136, and Stop 138.

If (OP=0?) 106 condition is "NO" axle Misalignment 108a condition is determined and the testing begins by checking if the value is greater than zero (LSDA>0) 110 (meaning the left side of the drive axle moved rearward), an indication of a negative thrust angle 110*a* will be determined. The testing is exited at this time through Connector 134, Receive Results 136, and Stop 138.

If the value is less than zero (LSDA<0) 112 (meaning the left side of the drive axle moved forward), an indication of a positive thrust angle 112*a* will be determined. The testing is exited at this time through Connector 134, Receive Results 136, and Stop 138. After LSDA is checked the operation process continues to RSDA.

If the value of RSDA is greater than zero, (RSDA>0) 114 (meaning the right side of the drive axle moved rearward), a positive thrust angle 114*a* will be determined. The testing is exited at this time through Connector 134, Receive Results 136, and Stop 138.

If the value is less than zero, (RSDA<0) 116 (meaning the right side of the drive axle moved forward), a negative thrust angle 116*a* will be determined. The testing is exited at this time through Connector 134, Receive Results 136, and Stop 138.

After RSDA is checked, the process is repeated through Loop Connector 104, where (OP=0?) 106 is tested. The sequence will repeat the steps until the loop is closed by determining that the value of operations are equal to zero, (OP=0?) 106, Alignment Correct 108 is indicated. The testing is exited at this time through Connector 134, Receive Results 136, and Stop 138.

The above is an example and is not limited to only the conditions illustrated, but may include other axle alignment conditions described in the present specification. The algorithm seen in FIG. 7*c* may also be used with GPS axle alignment monitoring described as one embodiment of the present invention.

FIG. 8*a* shows in one embodiment, how a relative position may be determined between an axle's initial position and the axle's actual position. For example, the axle's position and deviation may be detected by an arrangement of sensors, segments, or pattern grids relative to sensor 40. Baseline device 30 is shown mounted on axle 58 and projecting baseline 28 perpendicular to the axle. If the actual position of axle 58 deviates from its normal or initial position, it causes baseline 28 to skew from its initial position represented by zero point 38 at sensor 40, which may be located adjacent or in proximity to axle 58. One or more sensors, segments, or pattern grids at sensor 40 would detect a distance or degree of deviation 60*a* and generate specific data relative to the actual position or deviation of axle 58. The deviation may produce a positive or negative axle alignment condition, depending on which side of vehicle centerline 70 that the axle's vector points. The axle's vector is shown as a forward line perpendicular to the axle. One or more signals may be generated by the sensors, segments, or pattern grids surrounding zero point 38 of sensor 40 (seen in FIG. 8*b*) that would identify specific axle deviation data and/or misalignment data such as but not limited to, a distance, direction of deviation or movement, deviation angle, angle of axle 58 relative to centerline 70, angle of deviation between the baseline 28 and centerline 70, or other axle alignment data described herein. Obtained data may be utilized to determine axle alignment threshold values 74, one or more axle alignment conditions (see FIG. 7*c*), one or more axle alignment instructions (see FIG. 8*c*), and/or to control one or more axle alignment actuator devices (see FIG. 8*c*).

FIG. 8*b* shows one example of sensor 40 divided into quadrants utilizing specific coding for determining axle alignment conditions and/or alerts, controlling an air supply unit, determining axle alignment instructions which may be used for instructing manual axle alignment, or controlling automation of one or more axle alignment actuators.

For clarity, see FIG. 8*b* simultaneously with FIG. 8*c* for comparison of the quadrants of sensor 40 to the algorithm seen in FIG. 8*c*. For example, in FIG. 8*c*, Start 100 begins the sequence of steps for determining an axle alignment instruction for a vehicle's rear tandem axle. Read OP 102 reads the operations. Then tests if the operations equal zero (OP=0?) 106 and is executed if the condition is "YES" Alignment Correct 108 is indicated. The testing is exited at this time through Connector 134, Receive Results 136, and Stop 138.

If (OP=0?) 106 condition is "NO" axle Misalignment 108*a* condition is detected and the testing begins by checking if the value is greater than zero (LSRT>0) 118 (meaning the left side of the tandem axle moved rearward), an instruction to adjust the left side of the rear tandem axle forward 118*a* will be determined. The testing is exited at this time through Connector 134, Receive Results 136, and Stop 138.

If the value is less than zero (LSRT<0) 120 (meaning the left side of the tandem axle moved forward), an instruction to adjust the left side of the rear tandem axle rearward 120*a* will be determined. The testing is exited at this time through Connector 134, Receive Results 136, and Stop 138. After LSRT is checked the operation process continues to RSRT.

If the value of RSRT is greater than zero, (RSRT>0) 122 (meaning the right side of the tandem axle moved rearward), an instruction to adjust the right side of the rear tandem axle forward 122*a* will be determined. The testing is exited at this time through Connector 134, Receive Results 136, and Stop 138.

If the value is less than zero, (RSRT<0) 124 (meaning the right side of the tandem axle moved forward), an instruction to adjust the right side of the rear tandem axle rearward 124*a* will be determined. The testing is exited at this time through Connector 134, Receive Results 136, and Stop 138.

After RSRT is checked, the process is repeated through Loop Connector 104, where (OP=0?) 106 is tested. The sequence will repeat the steps until the loop is closed by determining that the value of operations are equal to zero, (OP=0?) 106, Alignment Correct 108 is indicated. The testing is exited at this time through Connector 134, Receive Results 136, and Stop 138.

The above is an example and is not limited to only the axle alignment instructions illustrated in the algorithm of FIG. 8*c*, but may be written to include other instructions such as described in this specification. The algorithm seen in FIG. 8*c* may also be used with GPS axle alignment monitoring described as one embodiment of the present invention.

Figure 9A:
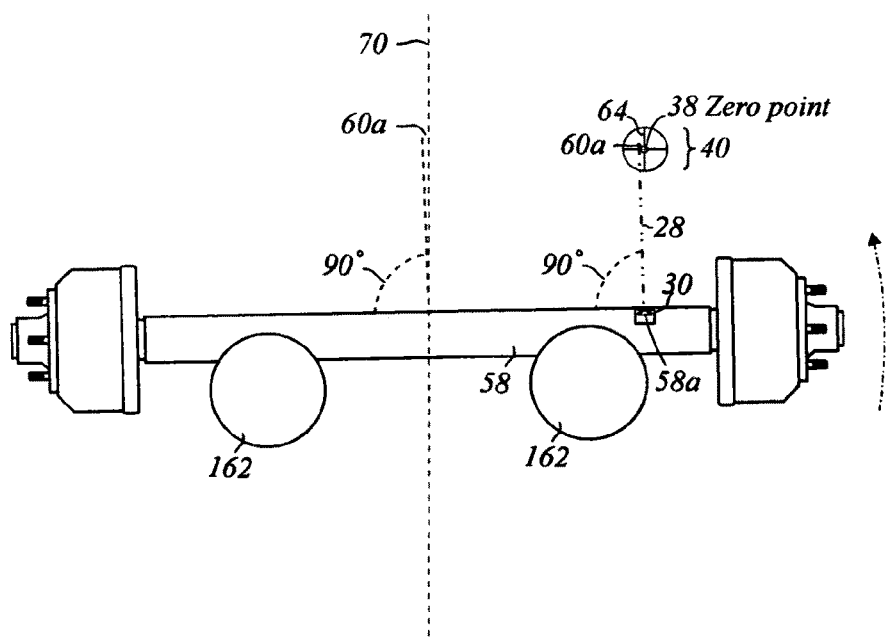
FIG. 9a shows the present invention determining a misaligned axle due to a leaning vehicle caused by an uneven load distribution.
Figure 9C:
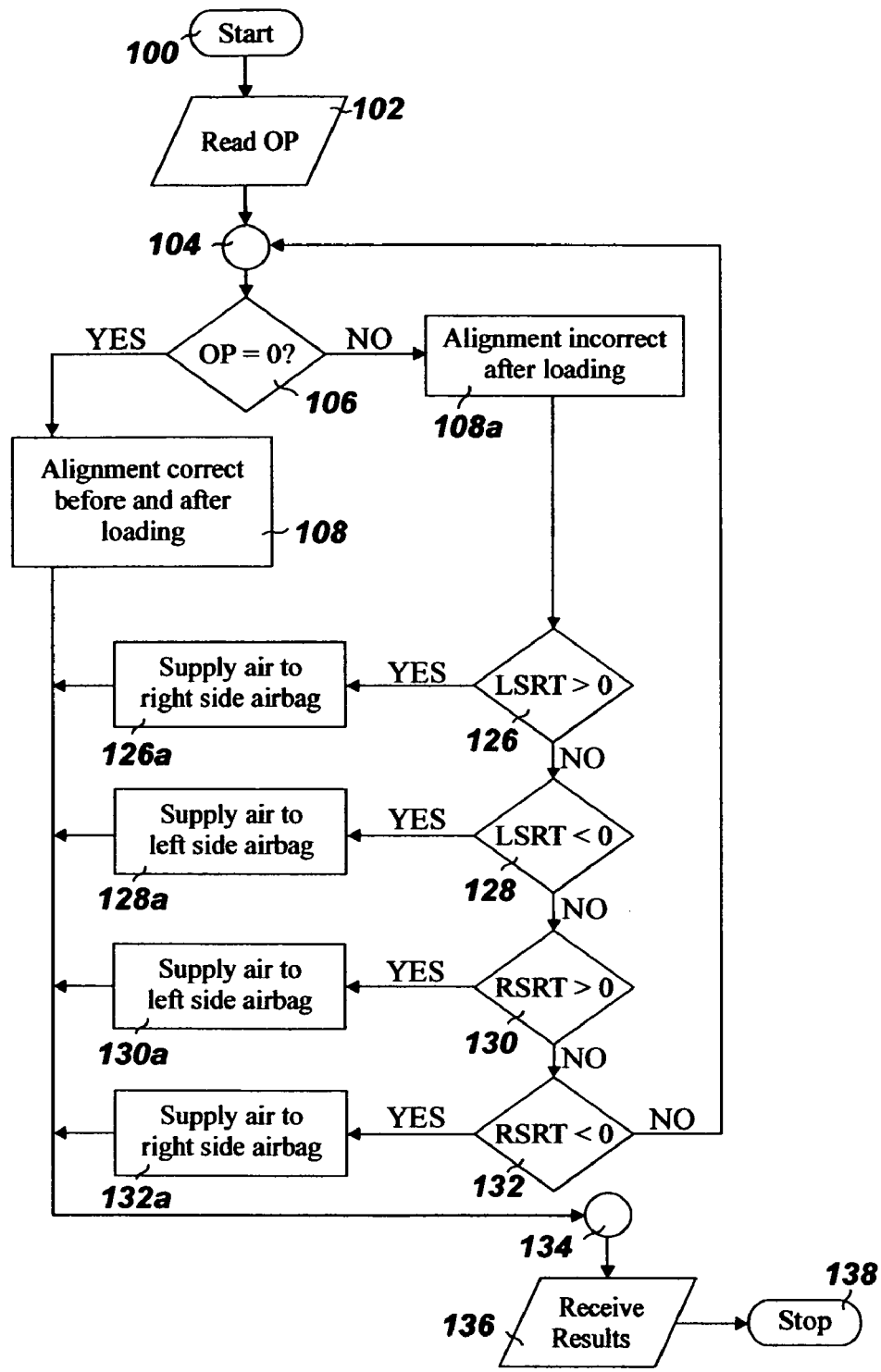
FIG. 9c shows an example of a flowchart representation of a solution algorithm using structured type programming for supplying air to a vehicle's suspension airbag when axle misalignment is detected due to a leaning vehicle.

FIG. 9*a* shows how axle deviation may be detected due to an uneven weight load of a vehicle. For example, a baseline device 30 mounted on axle 58 establishes point 58*a* and projects baseline 28 perpendicular to axle 58 which intersects zero point 38 at sensor 40. With a properly distributed weight load baseline 28 will be parallel to vehicle centerline 70, which may be determined by the relationship between baseline 28 and zero point 38 at sensor 40 (see FIG. 7*a*). During loading of the vehicle the weight load may compress the suspension (as seen in FIG. 6*b*) and the relationship between zero point 38 of sensor 40 and baseline 28 may be changed and a new zero point 38 may be set relative to central axis 64 (this may alternatively be done through a new distance determined between the first and second points). If the weight load is distributed unequally and creates a vehicle lean, baseline 28 will move from zero point 38 at central axis 64 and indicate data that may be used to determine axle deviation 60*a* (seen in FIGS. 9*a* and 9*b*), according to the uneven weight load of the vehicle. This data may be used for controlling an onboard air supply 160 for inflation of at least one airbag 162 of the vehicle's suspension (see FIG. 15).

FIG. 9b shows one example of sensor 40 divided into quadrants utilizing specific coding for controlling an onboard air supply to the vehicle's airbag suspension.

For clarity, see FIG. 9b simultaneously with FIG. 9c for comparison of the quadrants of sensor 40 to the algorithm seen in FIG. 9c. For example, Start 100 begins the sequence of steps for determining an instruction for supplying air to the airbag. Read OP 102 reads the operations. Then tests if the operations equal zero (OP=1?) 106 and is executed if the condition is "YES" Alignment correct before and after loading 108 is indicated. The testing is exited at this time through Connector 134, Receive Results 136, and Stop 138.

If (OP=0?) 106 condition is "NO" axle alignment incorrect after loading 108a condition is detected and the testing begins by checking if the value is greater than zero (LSRT>0) 126 (meaning the left side of the rear tandem axle moved rearward), an instruction to supply air to the right side airbag 126a will be determined. The testing is exited at this time through Connector 134, Receive Results 136, and Stop 138.

If the value is less than zero (LSRT<0) 128 (meaning the left side of the rear tandem axle moved forward), an instruction to supply air to the left side airbag 128a will be determined. The testing is exited at this time through Connector 134, Receive Results 136, and Stop 138. After LSRT is checked the operation process continues to RSRT.

If the value of RSRT is greater than zero, (RSRT>0) 130 (meaning the right side of the rear tandem axle moved rearward), an instruction to supply air to the left side airbag 130a will be determined. The testing is exited at this time through Connector 134, Receive Results 136, and Stop 138.

If the value is less than zero, (RSRT<0) 132 (meaning the right side of the rear tandem axle moved forward), an instruction to supply air to the right side airbag 132a will be determined. The testing is exited at this time through Connector 134, Receive Results 136, and Stop 138.

After RSRT is checked, the process is repeated through Loop Connector 104, where (OP=0?) 106 is tested. The sequence will repeat the steps until the loop is closed by determining that the value of operations are equal to zero, (OP=0?) 106, Alignment Correct 108 is indicated. The testing is exited at this time through Connector 134, Receive Results 136, and Stop 138.

The above is an example and is not limited to only the instructions illustrated in FIG. 9c, but may include other instructions such as, but not limited to the instructions described throughout this specification. The algorithm seen in FIG. 9c may also be used with GPS axle alignment monitoring described as one embodiment of the present invention.

Alternatively, the present invention may be utilized to adjust axle 58 to compensate for uneven load by detecting the change or deviation 60a in the perpendicular alignment between axle 58 and centerline 70 and then controlling an engagement and disengagement of actuator 84 (seen in FIGS. 10-14) until axle 58 is again perpendicular to the vehicle's centerline 70, thus, maintaining proper axle alignment.

Figure 19:
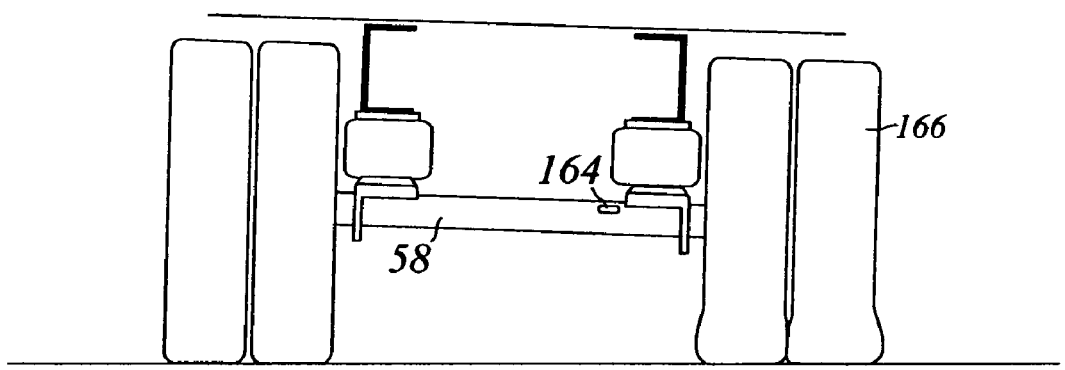
FIG. 19 shows a level sensor which may be used in conjunction with the present invention for distinguishing between axle misalignment due to a low tire or an uneven weight load.

Furthermore, the above algorithm may also be written to supply air to one or more tires having low air pressure when the low pressure of the tire affects the alignment of axle 58 (see FIG. 19).

Figure 10:
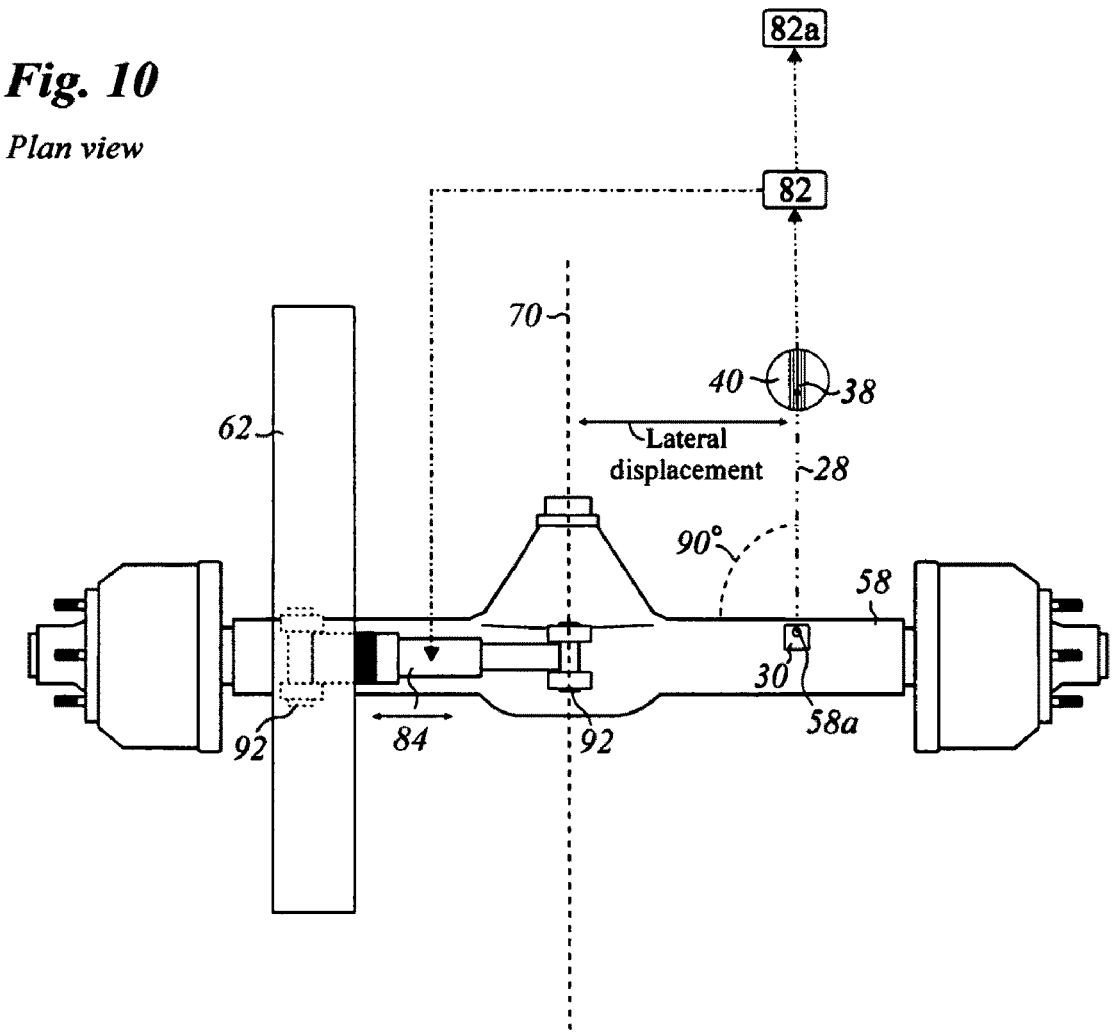
FIG. 10 shows a plan view of one embodiment of the present invention including a directional sensor for detecting lateral displacement of the axle as compared to the vehicle centerline by using a reference point adjacent to the axle, and an actuator is shown which may be positioned perpendicular to the vehicle centerline for aligning the axle if displacement is detected.

FIG. 10 shows an example of one embodiment of the present invention where directional sensor 40 is placed at first fixed control point 38 (see FIG. 18 box 140), which is selectively established in proximity to axle 58. Baseline device 30 is placed at second fixed control point 58a, which is on or in proximity to axle 58 (see FIG. 18 box 142). These two points are shown with respect to a properly aligned axle 58. During setup of the present invention, baseline device 30 may be used to establish a perpendicular relationship between baseline 28 and axle 58 which, when aligned to sensor 40, is parallel to vehicle's centerline 70 and indicates that axle 58 is perpendicular to vehicle's centerline 70. Baseline 28 and sensor 40 is used for determining a measurable relationship between first point 38 and second point 58a (see FIG. 18 box 144). When baseline 28 moves from its original or initial position it generates a signal that indicates lateral displacement or a misalignment condition of axle 58 (see FIG. 18 box 146). This signal may be sent to onboard computer 82, onboard display 82a, or a remote computer. Furthermore, the signal may be sent from computer 82 or sensor 40 to actuator 84. Actuator 84 is shown mounted by bolts or pins 92 to frame 62 and axle 58 in a transverse direction and may be utilized for adjusting the lateral position of axle 58 (see FIG. 18 box 148). The adjustment is determined according to the relationship between sensor 40 and baseline 28.

Alternatively, sensor 40 and baseline device 30 may be mounted in a vice versa manner, where sensor 40 is mounted relative to axle 58 and baseline device 30 is mounted relative to the vehicle's body or frame 62.

Figure 11A:
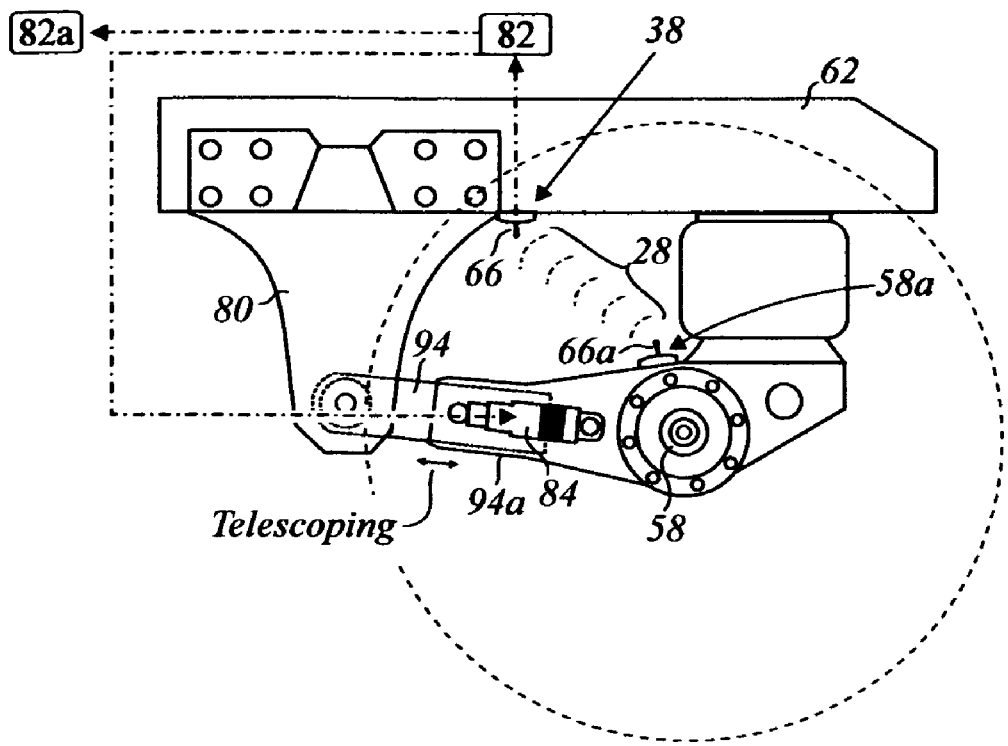
FIG. 11a shows an elevation view of a vehicle's suspension and the present invention utilizing electromagnetic wave or ultrasonic wave devices for determining a distance between two fixed points on the vehicle.

FIG. 11a shows an example of one embodiment of the present invention where an electromagnetic wave device 66 is mounted at the first fixed control point 38 (see FIG. 18 box 140) at vehicle's frame or body 62 and an electromagnetic wave sensor or receiver 66a is mounted at the second fixed control point 58a (see FIG. 18 box 142) on or in proximity to axle 58. An electromagnetic wave 28 is used to measure the distance between the two fixed control points (see FIG. 18 box 144). Obtained data could be sent to computer 82 for collecting, storing, calculating, displaying, printing, or comparing distances between emitter 66 and receiver 66a. Distances may be compared to a predetermined reference frame or values to determine one or more axle alignment conditions (see FIG. 7c and FIG. 18 box 146), one or more axle alignment instructions (see FIG. 7c), and/or controlling one or more actuators 84 (see FIG. 18 box 148) mounted relative to axle 58 or a suspension member. Axle alignment condition and/or instruction may be sent to an onboard display 82a, remote computer or remote receiver 68 (seen in FIG. 5b). Alternatively, emitter 66 and receiver 66a may be mounted in a vice versa manner, where emitter 66 is mounted relative to axle 58 and receiver 66a is mounted relative to the vehicle's body or frame 62.

Alternatively, the data may be used for controlling an air supply unit 160 (see FIG. 15), which may supply air to a low airbag 162 (see FIG. 15) of the vehicle's suspension or a low tire (see FIG. 19), if the low air pressure is determined to have an affect on the alignment of axle 58.

Figure 11B:
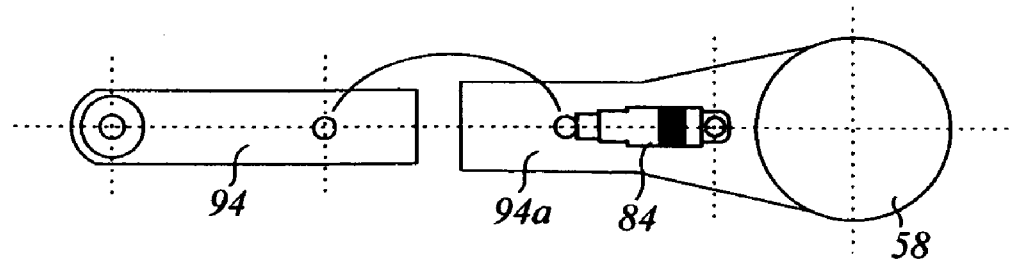
FIG. 11b shows an elevation view of a telescoping trailing arm housing an actuator.

FIG. 11b shows a telescoping trailing arm consisting of two parts: inner arm 94 and outer arm 94a. An actuator 84 is located at the trailing arm and has one end attached to inner arm 94 and the other end attached to outer arm 94a.

Figure 12:
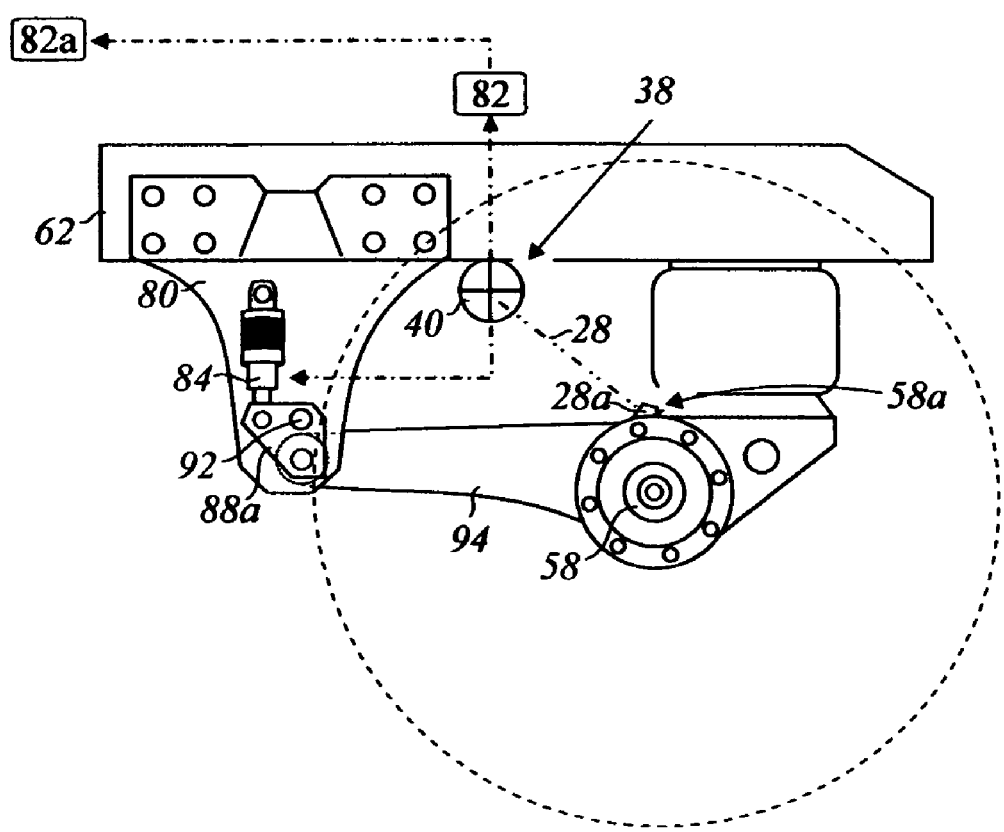
FIG. 12 shows an elevation view of a vehicle's suspension illustrating one embodiment of the present invention utilizing a laser and directional sensors in communication with an axle alignment actuator mounted on a rocker arm mechanism relative to the vehicle's trailing arm and frame.

FIG. 12 shows an example of one embodiment of the present invention where a directional sensor 40 is mounted at a first fixed control point 38 (see FIG. 18 box 140) at the vehicle's body or frame 62 and a laser 28a is mounted at a second fixed control point 58a (see FIG. 18 box 142) at axle 58. Laser 28a may be used for determining a measurable relationship between the two fixed control points. Obtained data may be sent to computer 82 for collecting, storing, calculating, displaying or comparing the measured relationship between sensor 40 and laser 28a, wherein axle alignment conditions and related data may be provided (see FIG. 18 box 144 and 146). Actuator 84 is shown mounted substantially vertical to frame member 80 and oscillatory or rocker arm mechanism 88. Mechanism 88 is connected to trailing arm 94 and may be used for automatically adjusting axle 58 based on the measured relationship (see FIG. 18 box 148). Alternatively, laser 28a and sensor 40 may be mounted in a vice versa manner, where sensor 40 is mounted relative to axle 58 and laser 28a is mounted relative to the vehicle's body or frame 62. Furthermore, the data may be used for controlling an air supply unit 160 (see FIG. 15), which may supply air to a low airbag 162 (see FIG. 15) of the vehicle's suspension or a low tire (see FIG. 19), if the low air pressure is determined to have an affect on the alignment of axle 58.

Figure 13:
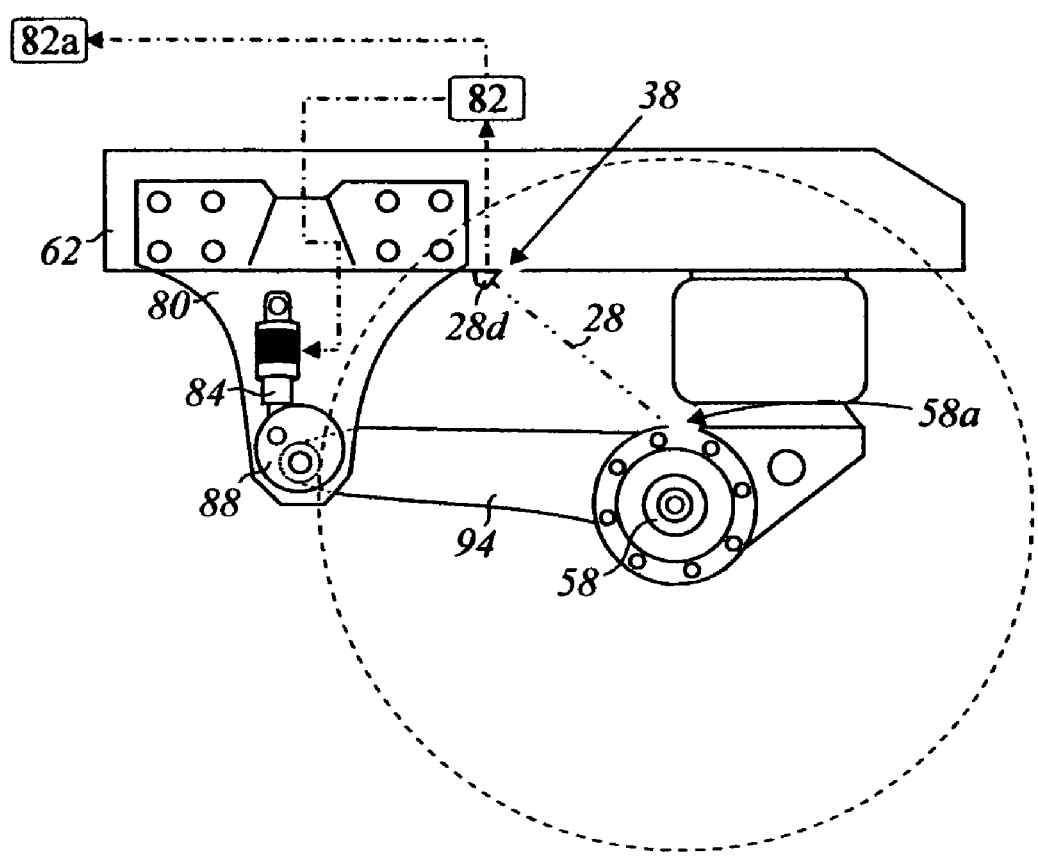
FIG. 13 shows an elevation view of a vehicle's suspension illustrating one embodiment of the present invention utilizing a wave emitting source, computer, and an axle alignment actuator mounted on a cam mechanism relative to the vehicle's trailing arm and frame.

FIG. 13 shows an example of one embodiment of the present invention utilizing a time of flight sensor such as an electromagnetic wave emitting device 28d having a built-in emitter and detector or receiver which may be mounted at a first fixed control point 38 (see FIG. 18 box 140) on or in proximity to the vehicle's body or frame 62. Wave emitting device 28d is used for emitting a baseline 28 in a form of wave or beam to a target located at a second fixed control point 58a (see FIG. 18 box 142) on or in proximity to axle 58 for determining a measurable relationship between the first and the second control point (see FIG. 18 box 144). Obtained data may be sent to computer 82 for collecting, storing, calculating, displaying, or comparing distance between wave emitting device 28d and second point 58a at axle 58 (see FIG. 18 box 146), wherein axle alignment conditions and related data may be provided. Actuator 84 is shown mounted substantially vertical to frame member 80 and rotary mechanism 88. Rotary mechanism 88 is connected to trailing arm 94 and may be used for adjusting axle 58 (see FIG. 18 box 148). Alternatively, wave emitting device 28d may be mounted relative to axle 58 for measuring a distance to a point on body or frame 62. Furthermore, the data may be used for controlling an air supply unit 160 (see FIG. 15), which may supply air to a low airbag 162 (see FIG. 15) of the vehicle's suspension or a low tire (see FIG. 19), if the low air pressure is determined to have an affect on the alignment of axle 58.

Figure 14:
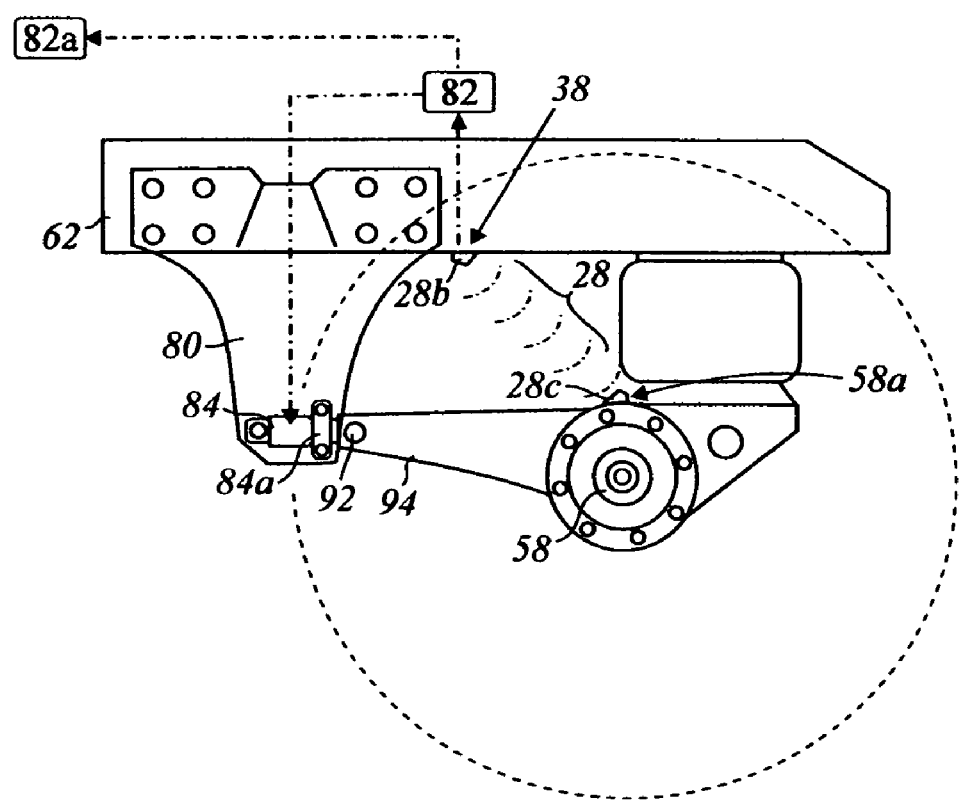
FIG. 14 shows an elevation view of a vehicle's suspension illustrating one embodiment of the present invention utilizing a camera, target, computer, and an axle alignment actuator mounted substantially horizontal relative to the vehicle's trailing arm and frame.

FIG. 14 shows an example of one embodiment of the present invention utilizing a time of flight sensor such as a camera 28b located at a first fixed control point 38 (see FIG. 18 box 140) on or in proximity to the vehicle's body or frame 62 and a target 28c located at a second control point 58a (see FIG. 18 box 142) on or in proximity to axle 58. A baseline 28 is used to determine a measurable relationship between the first and second control points (see FIG. 18 box 144). Obtained data may be sent to a computer 82 for collecting, storing, calculating, displaying, or comparing distance between camera 28b and target 28c. Data may be used for determining axle alignment conditions (see FIG. 7c and FIG. 18 box 146), axle alignment instructions (see FIG. 8c), and/or controlling actuator 84 (see FIG. 8c). Actuator 84 is shown mounted to frame member 80 in a substantially horizontal position. Mounting bracket 84a or other suitable means may be used for securing actuator 84 relative to frame member 80 and bolts 92 may secure actuator 84 to trailing arm 94. Alternatively, camera 28b and target 28c may be mounted in a vice versa manner where camera 28b is mounted relative to axle 58 and target 28c is mounted relative to the vehicle's body or frame 62. Furthermore, the data may be used for controlling an air supply unit 160 (see FIG. 15), which may supply air to a low airbag 162 (see FIG. 15) of the vehicle's suspension or a low tire (see FIG. 19), if the low air pressure is determined to have an affect on the alignment of axle 58.

Figure 15:
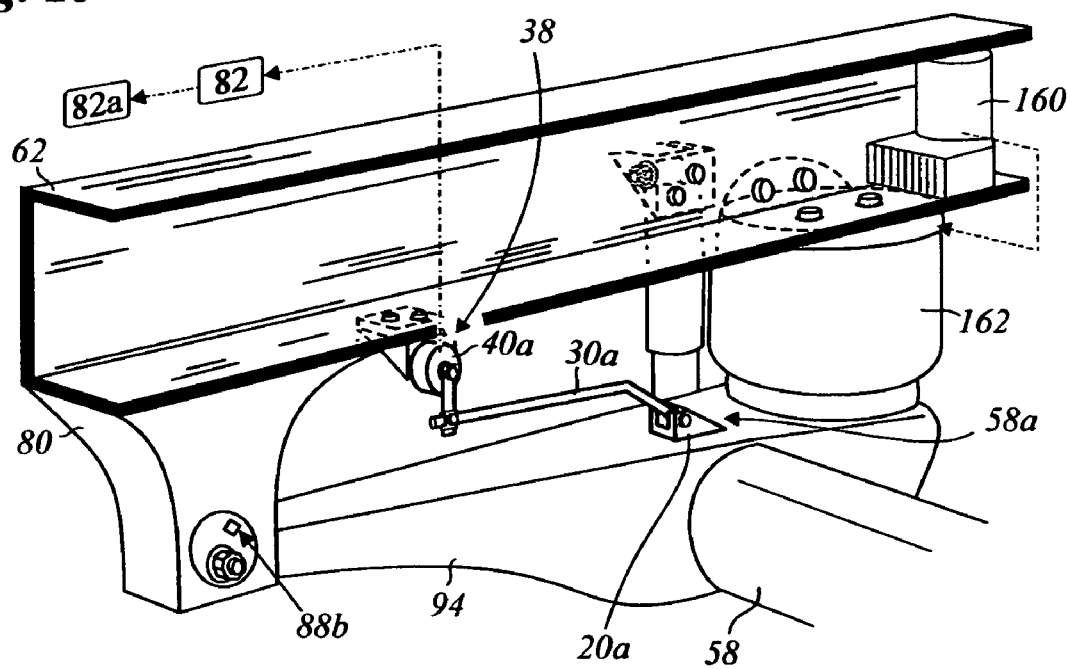
FIG. 15 shows a perspective view of a vehicle's axle, trailing arm, and frame, that illustrates one embodiment of the present invention utilizing an encoder or potentiometer coupled with mechanical linkage and a manual axle adjustment mechanism.

FIG. 15 shows an example of the present invention in one embodiment utilizing an encoder or potentiometer 40a located at a first fixed control point 38 (see FIG. 18 box 140) selectively established on or in proximity to the vehicle's body or frame 62. A second control point 58a may be selectively established relative to mounting base 20a located on or in proximity to axle 58, trailing arm 94, or other suspension member (see FIG. 18 box 142). Mounting base 20a may be used for mounting one end of a mechanical arm or rod 30a relative to base 20. The other end of rod 30a may be connected relative to encoder or potentiometer 40a. The axle's alignment may be determined by a measurable relationship between the first control point 38 and the second control point 58a through movement of arm 30a relative to encoder or potentiometer 40a (see FIG. 18 box 144), which may be caused by displacement of axle 58. Obtained data may be sent to computer 82 for collecting, storing, calculating, displaying, or comparing a distance between encoder or potentiometer 40a and mounting base 20a. The data may be compared to a predetermined reference frame or values for determining one or more axle alignment conditions (see FIG. 18 box 146), one or more axle alignment instructions (see FIG. 7c), and/or controlling one or more axle alignment actuators 84 (see FIG. 18 box 148) mounted relative to axle 58 or to a suspension member such as trailing arm 94. Alternatively, a manual axle adjustment mechanism 88b may be used for manual adjustment of axle 58 (see FIG. 18 box 148). Furthermore, the data may be used for controlling an air supply unit 160 (see FIG. 15), which may supply air to a low airbag 162 (see FIG. 15) of the vehicle's suspension or a low tire (see FIG. 19), if the low air pressure is determined to have an affect on the alignment of axle 58.

Figure 16:
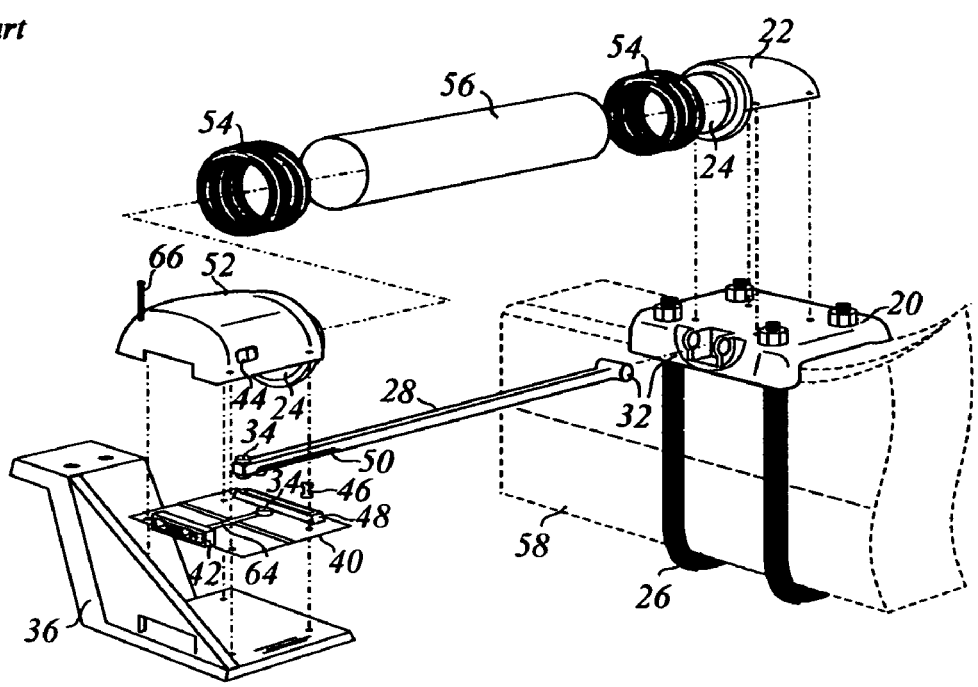
FIG. 16 shows an exploded view of my prior art axle monitoring apparatus which includes an axle and a rod extending from the axle for pointing to directional sensors or a sensing plane, and a housing for enclosing the sensor and rod.

FIG. 16 shows one example of a disassemble view of my prior axle alignment system utilizing a mechanical link as an indicator, arm, or line segment 28. A mounting plate 20 is attached to axle 58 by U shaped bolts 26. A sensor support bracket 36 is attached to the inside section of frame rail 62. A segmented plane 40 is attached to sensor support bracket 36. Sensor support bracket 36 should be attached to only one side of frame rail 62 and not to a cross-member of the vehicle. Attaching sensor support bracket 36 (containing sensor 40) to only one side of frame 62 provides means for detecting a diamond condition as the sensor support bracket is fixed to frame 62 while axle 58 will become skew to sensor bracket 36 (and sensor 40) upon a diamond frame condition. Support bracket 36 may be attached to the vehicle using any means which may be accepted by the vehicle manufacture. Indicator 28 has a first end attached to a hinge 32 located on mounting plate 20 and the second end connected to sensor support bracket 36 coupled by an indicator guide 46. Indicator guide 46 is inserted into a longitudinal groove 50 located at the end of indicator 28 and inserted into a slot 48 positioned transverse to segmented plane 40. The connection of hinge 32 and indicator guide 46 maintains the relation between indicator 28 and segmented plane 40 by allowing indicator 28 to slide left, right, forward and rearward of central path 64 during suspension travel and axle deviation. Position sensor 34 is shown along a central path 64 of segmented plane 40. A plate cover 22 is attached to mounting plate 20 and has an opening 24 on one side. A sensor cover 52 is placed over segmented plane 40 attached to sensor support bracket 36. The sensor cover 52 has an opening 24 on one side. Opening 24 of plate cover 22 and opening 24 of sensor cover 52 faces one another and are connected by housing tube 56 with flex boot 54 at each end. Indicator 28 is located inside of housing tube 56. Indicator 28 is positioned in line with the path 64 of segmented plane 40. Housing tube 56 and flex boots 54 are used for keeping indicator 28 clean from road and weather conditions. A wiring connection 42 is used to connect the apparatus to a vehicle's power system. An auxiliary battery (not shown)

may be used with an on/off or reset switch 44 for checking and correcting axle alignment when the vehicle is not in service such as stationary or when electrical power is unavailable.

Figure 17:
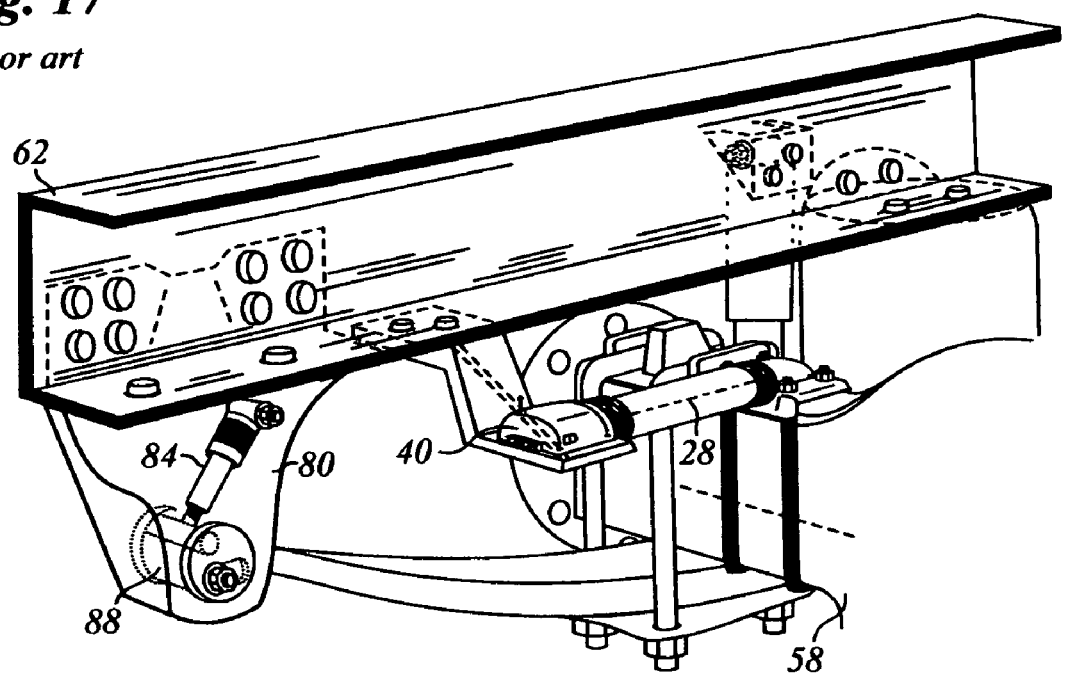
FIG. 17 shows a perspective view of my prior art axle alignment apparatus assembled and mounted relative to a vehicle's axle and frame with a linear actuator for rotating the axle's adjustment mechanism.

FIG. 17 shows an assembled view of my prior alignment apparatus seen in FIG. 16 which is mounted between vehicle's axle 58 and frame 62. Actuator 84 is attached to frame member 80 at one end and cam mechanism 88 at the other end. Line segment 28 of my previous axle alignment device is shown here and described in my previous patent, No. 7,415,771 as a means to point between axle 58 and sensor 40.

FIG. 18 shows one method for setup and operation of the present invention onboard a vehicle. Step one 140 establishes a first point onboard a vehicle; step two 142 establishes a second point on or in proximity to the vehicle's axle; step three 144 provides means onboard the vehicle for performing a step for measuring a relationship between the first point and the second point while the vehicle is either stationary or in motion; step four 146 provides means onboard the vehicle for performing a step for determining at least one axle alignment condition based on the measured relationship; step five 148 is an option for providing means onboard the vehicle for performing a step for adjusting an axle based on the measured relationship; step six 150 provides means onboard the vehicle for performing a step for providing an alert relative to the axle's alignment condition.

FIG. 19 shows a level sensor 164 mounted on axle 58, which may be used in conjunction with the present invention for distinguishing between axle misalignment due to a low tire 166 or axle misalignment due to an uneven weight load.

Advantages

From the descriptions above, the following advantages become evident when using the present alignment apparatus:
  Reducing driver fatigue;
  Reducing tire wear;
  Reducing tire temperature;
  Reducing tire failure;
  Reducing rolling resistance;
  Reducing component vibration and wear;
  Reducing operating cost;
  Improving highway safety;
  Improving fuel economy;
  Improving vehicle efficiency and performance;
  Providing a system onboard a vehicle which will monitor the alignment of the vehicle's axles while the vehicle is either stationary or in motion.

RAMIFICATIONS AND SCOPE

Accordingly, the reader will see that the present invention can be made and designed in different ways in order to achieve the desired results. Although the description above contains much specificity, these should not be construed as limiting the scope of the present invention, but as merely providing illustrations of some of the presently preferred embodiments of my apparatus.

For example, the structure of the present invention may have other shapes such as circular, oval, triangular, etc. The parts of the present invention may be made of any material such as aluminum, metal, plastic, fiberglass, etc. Also various sizes may be used for any of the parts such as the actuator, cams, etc.

The present invention may use any means to point, indicate, measure, or link the axle's alignment to the direction of the vehicle's centerline, geometric centerline, or direction of vehicle travel or link to any other component that will compare the axle's alignment to one or more predetermined points located on the vehicle and/or to a predetermined value. Incorporation by Reference under 37 CFR 1.57 from U.S. Pat. No. 7,467,473 is a list of sensors which include a variety of contact and non-contact sensors such as pressure sensors, voltage sensors, magnetic sensors, proximity sensors, photo-electric using light or dark energized sensors, capacitive sensors, inductive sensors, conductive plates, reflective sensors, and various type switches. Further incorporation by reference from U.S. Pat. No. 7,467,473 includes a telescoping arm, rod, or mechanical link which includes sensors which detect telescoping movement between the axle and a sensing plane. Further incorporation by reference from U.S. Pat. No. 7,467,473 states that the apparatus may be used without a computer. For example, the segments of the sensing plane may send signals directly to a receiver for displaying axle alignment instructions to an operator or to mechanical devices such as actuators which automatically adjust the axle.

The baseline may be chosen from a variety of means such as mechanical, laser, camera, ultrasonic, magnetic, electromagnet, electrical, optical, wave, pressure or non-pressure sensor, calculation, or other suitable means which will point, touch, measure, or indicate a relative position or spatial relationship between the first fixed point located onboard the vehicle such as on or in proximity to the body, frame, suspension, or axle and the second fixed point on or in proximity to an axle or suspension member.

A controller of the present invention may include means such as a computer or logic system for transmitting and receiving signals utilizing wire or wireless, fiber optics, radio waves or Bluetooth, or other suitable means for communicating axle alignment and related data, such as axle alignment conditions or instructions, to an actuator, receiver or handheld receiver, onboard display, remote computer, or onboard computer. The signals used to indicate and transmit axle alignment data and/or instructions may include wireless signals such as cell or satellite signals. These signals may be sent to a main dispatch terminal to notify an operator of axle alignment conditions or the adjustment made to a particular axle by the onboard axle alignment system.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, memory chips, hard drives, or any other computer readable storage medium, wherein, when the computer program code is loaded into and executed by an electronic device, such as a computer, micro-processor or logic circuit, the device becomes an apparatus for practicing the invention.

The present invention may also include a receiver or transmitter which may be used to communicate axle alignment condition during a manual routine axle alignment check when the vehicle is not in operation. (The following is incorporated by reference from parent case, U.S. Pat. No. 7,415,771). A receiver, monitor or indicator may be used for receiving a signal which will display a light, sound, text or voice command that will indicate and instruct axle alignment. The signal may be sent from the axle alignment apparatus by wire, wireless, fiber optics, or any other means for transmitting signals to a receiver such as, an earpiece, headphone, remote hand held display, or device such as a computer for storing axle alignment instruction and data. Signals may also be transmitted wireless to a main dispatch terminal for notifying maintenance and operation managers that a particular axle of a particular vehicle is operating with an unsafe alignment. The receiver may be placed onboard the vehicle in view of the driver. However, the receiver may also be placed off the vehicle, linked by wire, wireless or any other means to communicate when axle alignment is necessary or communicate during a routine alignment check when the vehicle is not in operation. For example, a vehicle may require an alignment check before the vehicle is assigned for operation. The technician may have a receiver which can link to and check any vehicle that has the present alignment apparatus installed and may further perform radio controlled axle alignment using the remote transmitter or perform the axle alignment manually if necessary. An auxiliary battery could be used to power the present invention when no other power source is available.

The above embodiments of the present invention may further be arranged in any combination or configuration suitable for determining a measurable relationship between two or more points located onboard the vehicle.

Alternatively, when using GPS as one embodiment of the present invention, a GPS receiver antenna may be mounted on the right side of the axle, a GPS receiver antenna may be mounted on the left side of the axle, and a GPS receiver antenna may be mounted on the vehicle's outer body or roof and is used as a master control point. GPS data received from the GPS antennas located at the right side axle and at the roof may be stored by a computer for comparison until GPS data from the GPS antennas located at the left side axle and roof is collected. Alternatively, a wheelbase measurement may be obtained utilizing a GPS receiver antenna at one axle and a GPS receiver antenna at another axle, which are on the same side of the vehicle, and utilizing a GPS receiver antenna located at the roof to determine a distance between the two GPS antennas located at the axles.

Alternatively, multiple GPS antennas may be arranged in a compass orientation onboard the vehicle. For example, a first set of GPS antennas may be utilized on or in proximity to the vehicle such as on the vehicle's outer body or roof and arranged to establish a line perpendicular to the vehicle's centerline. A second set of GPS antennas may be attached in a line relative to a central axis of a hub or wheel cap located at the outer end of an axle. This configuration, with respect to a proper axle alignment condition, establishes a baseline which is perpendicular to the vehicle's centerline and parallel to the axles. Any deviation from parallelism would be detected by GPS means and used for determining one or more axle alignment conditions, one or more axle alignment instructions, and/or controlling one or more axle alignment actuators attached relative to the vehicle's axle or suspension member. Alternatively, the GPS antennas may be arranged in any orientation about the vehicle and still achieve the desired function of the present invention.

The axle' alignment may be further monitored and compared with the vehicle's performance data gathered through monitoring engine operating conditions, speed, rpm, cylinder head pressure, temp, torque, thrust, transmission parameters, tire pressure, and vehicle front end suspension movement. A driver's physical condition may be evaluated or estimated based on the obtained data, such as physical effort to steer the vehicle.

Additional sensors may be included in conjunction with the present invention such as a steering sensor mounted relative to the vehicle's front steering and in communication with the present axle alignment invention. This combination may be used for actively communicating axle alignment conditions relative to the front steerable axles with respect to the non-steerable axles, wherein distinguishing between axle alignment conditions and wheel alignment conditions.

The present invention, when used on multiple axles and multiple vehicles such as a tractor trailer vehicle, may identify the particular vehicle (tractor or trailer), the particular axle (first, second, or third from the rear), the particular side of the axle (left or right), the particular direction in which to align the axle (forward, rearward, transverse), and to determine when the axle's alignment is correct.

The present invention may include timers as part of the control and logic system for controlling signals in order to dampen, delay, or maintain a consistent sequence of events on corrective actions.

The telescoping trailing arm described in FIG. 5a may alternatively include a manual adjustment for adjusting the trailing arm. The adjustment may include positioning means such as but not limited to rotary, oscillatory, or linear.

The camera described in FIG. 14 may be selected from the group of rangefinder devices such as optical depth sensors, CCD sensors, CCD camera, or CMOS camera, LED, depth perception light sources, radiated light in 2D or 3D, radiation emitter, radiation detector, position sensitive detector, or other suitable radiation source which may be used for communicating a distance between the camera and an object used as a reference point or bench mark, whereby a distance between two or more points onboard the vehicle may be determined.

The present invention may further include, but not limited to, utilizing a satellite of the Global Positioning Satellite (GPS) network, a satellite of the Galileo satellite network, a satellite of the Global Navigation Satellite System (GLONASS) network, a Wide Area Augmentation System (WAAS) enabled satellite and a European Geostationary Navigation Overlay Service (EGNOS) enabled satellite. The invention may further include Differential Global Positioning System (DGPS) and one or more DGPS equipped receivers and antennas. The invention may utilize a combination of GPS and Inertial Measurement Unit (IMU) or other suitable measurement means for determining a measurable relationship between two or more points located onboard the vehicle and use this information to determine one or more axle alignment conditions, one or more axle alignment instructions, and/or controlling one or more actuator devices mounted relative to the vehicle's axle or suspension member. Alternatively the present invention may utilize GPS receiver and antennas coupled with a computer for determining axle misalignment caused by a leaning vehicle such as having an uneven load, low airbag, or low tire.

In addition to the above description, the present alignment apparatus and method should not be limited to only alignment of tractor trailer axles but may be used for automatically aligning suspension control arm, or axles of other vehicles, such as passenger cars, van, trucks, buses, race cars, rail vehicles, and aircraft tandems.

Many features and advantages of the present invention are apparent from the detailed specifications. The appended claims are intended to cover all such features and advantages of the invention which fall within the true spirit and scope of the invention. Further, since numerous modifications and changes will readily occur to those skilled in the art, it is not desired to limit the invention to the exact construction and operation illustrated and described and accordingly all suitable modifications and equivalents may be resorted to falling within the scope of the invention.

We claim:

1. A method for determining a vehicle's axle alignment condition, implemented by an apparatus onboard the vehicle, comprising:
   a step for determining a measurable spatial relationship between at least two points located on a vehicle; and a step for determining an alignment condition of an axle of said vehicle which is based on said measurable spatial relationship, whereby said alignment condition of said axle can be determined while said vehicle is either stationary or in motion.

2. The method according to claim 1, wherein determining said measurable spatial relationship includes measuring the spatial relationship between a first point located relative to a body or frame of said vehicle and a second point located relative to said axle or a trailing arm associated with said axle.

3. The method according to claim 1, wherein said alignment condition of said axle includes a positive or a negative condition relative to a centerline reference of said vehicle.

4. The method according to claim 1, further including a step for determining said alignment condition of said axle with respect to a leaning condition of said vehicle caused by an unequally distributed weight load on said vehicle.

5. The method according to claim 1, further including a step for determining said alignment condition of said axle with respect to a leaning condition of said vehicle caused by air pressure of a tire of said vehicle.

6. The method according to claim 1, further including a step for determining said alignment condition of said axle with respect to a leaning condition of said vehicle caused by air pressure of an airbag suspension of said vehicle.

7. The method according to claim 1, further including a step for providing an instruction relative to the alignment of said axle, said instruction being based on said measurable spatial relationship between said points.

8. The method according to claim 1, further including a step for adjusting the alignment of said axle, said alignment being adjusted based on said measurable spatial relationship between said points.

9. The method according to claim 1, further including a step for adjusting the alignment of said axle while said vehicle is in motion.

10. The method according to claim 1, further including a step for processing axle alignment data which is based on said measurable spatial relationship between said points.

11. The method according to claim 1, further including a step'for documenting axle alignment data which is based on said measurable spatial relationship between said points.

12. The method according to claim 1, further including a step for communicating axle alignment data which is based on said measurable spatial relationship between said points.

13. The method according to claim 1, further including a step for providing a graphic illustration relative to said alignment condition of said axle.

14. The method according to claim 1, further including a step for receiving a Global Positioning System communication at a point relative to said axle, said communication being used in determining said alignment condition of said axle.

15. An apparatus onboard a vehicle for determining an alignment condition of an axle of said vehicle, comprising:
a means onboard a vehicle for determining a measurable spatial relationship between at least two points located on said vehicle; and a means for determining an alignment condition of an axle of said vehicle which is based on said measurable spatial relationship, whereby said alignment condition of said axle can be determined while said vehicle is either stationary or in motion.

16. The apparatus according to claim 15, further including a means for communicating axle alignment data which is based on said measurable spatial relationship.

17. The apparatus according to claim 15, further including a means for determining an instruction relative to the alignment of said axle which is based on said measurable spatial relationship.

18. The apparatus according to claim 15, further including a means onboard said vehicle for performing an adjustment relative to the alignment of said axle.

19. The apparatus according to claim 15, further including a potentiometer means for determining said measurable spatial relationship between said points, said points includes a first point located relative to a body or frame of said vehicle and a second point located relative to said axle or a trailing arm associated with said axle.

20. A method for determining a vehicle's axle alignment condition, implemented by an apparatus onboard the vehicle, comprising:
a step for receiving communication from a Global Positioning System, wherein said communication is received at a point located relative to a vehicle's axle; and a step for determining an alignment condition of said axle based on said communication, whereby said alignment condition of said axle can be determined while said vehicle is either stationary or in motion.

* * * * *